United States Patent
Zhou et al.

(10) Patent No.: US 12,003,130 B2
(45) Date of Patent: Jun. 4, 2024

(54) ENERGY STORAGE SYSTEM

(71) Applicant: Huawei Digital Power Technologies Co., Ltd., Shenzhen (CN)

(72) Inventors: He Zhou, Shanghai (CN); Zhaohui Wang, Nuremberg (DE); Xun Wang, Shanghai (CN); Yanzhong Zhang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 201 days.

(21) Appl. No.: 17/693,092

(22) Filed: Mar. 11, 2022

(65) Prior Publication Data

US 2022/0200314 A1    Jun. 23, 2022

Related U.S. Application Data

(63) Continuation of application No. PCT/CN2020/087918, filed on Apr. 29, 2020.

(51) Int. Cl.
   *H02J 7/00* (2006.01)
   *H02M 3/04* (2006.01)
   (Continued)

(52) U.S. Cl.
   CPC ........ *H02J 7/00712* (2020.01); *H02J 7/0013* (2013.01); *H02J 7/0048* (2020.01);
   (Continued)

(58) Field of Classification Search
   CPC ...... H02J 3/32; H02J 3/38; H02J 3/381; H02J 3/46; H02J 7/0013; H02J 7/0014;
   (Continued)

(56) References Cited

U.S. PATENT DOCUMENTS

| 7,773,395 B2 | 8/2010 | Siri |
| 8,508,074 B2 | 8/2013 | Shenoy et al. |

(Continued)

FOREIGN PATENT DOCUMENTS

| CN | 104993602 A | 10/2015 |
| CN | 109217392 B | 8/2020 |
| JP | 3217529 U | 8/2018 |
| JP | 2019134636 A | 8/2019 |
| WO | 2018222373 A1 | 12/2018 |
| WO | 2019081084 A1 | 5/2019 |

*Primary Examiner* — Levi Gannon
(74) *Attorney, Agent, or Firm* — Leydig, Voit & Mayer, Ltd.

(57) ABSTRACT

An energy storage system includes one or more energy storage unit clusters, and the energy storage unit cluster includes at least two energy storage modules connected in series. The energy storage system further includes a first bus, a second bus, and a centralized monitoring system of the energy storage unit cluster, where the second bus is a direct current bus. The energy storage unit cluster is coupled to the first bus by using a first converter. One energy storage module includes one energy storage element group and one DC/DC converter, and the energy storage element group is coupled to the second bus by using the DC/DC converter. The centralized monitoring system is connected to the energy storage unit cluster through a control bus, and is configured to control a DC/DC converter in any energy storage module in the energy storage unit cluster.

26 Claims, 18 Drawing Sheets

(51) Int. Cl.
*H02M 7/44* (2006.01)
*H02S 40/38* (2014.01)

(52) U.S. Cl.
CPC .......... *H02J 7/005* (2020.01); *H02J 7/00714* (2020.01); *H02M 3/04* (2013.01); *H02M 7/44* (2013.01); *H02S 40/38* (2014.12)

(58) Field of Classification Search
CPC ...... H02J 7/0024; H02J 7/0047; H02J 7/0048; H02J 7/0049; H02J 7/005; H02J 7/007; H02J 7/00712; H02J 7/00714; H02J 7/00716; H02J 7/007182; H02M 3/04; H02M 7/44; H02S 40/38
See application file for complete search history.

(56) References Cited

U.S. PATENT DOCUMENTS

| | | |
|---|---|---|
| 8,786,139 B2 | 7/2014 | Cummings |
| 9,166,416 B2 | 10/2015 | Gerlovin |
| 9,331,499 B2 | 5/2016 | Ikriannikov et al. |
| 9,692,242 B2 | 6/2017 | Butzmann |
| 2014/0042815 A1 | 2/2014 | Maksimovic et al. |
| 2015/0357843 A1 | 12/2015 | Kobayashi et al. |
| 2018/0167028 A1 | 6/2018 | Agarwal |
| 2018/0191173 A1 | 7/2018 | James et al. |
| 2020/0153351 A1* | 5/2020 | Jiao ................. H02J 7/0018 |
| 2020/0259330 A1* | 8/2020 | Dong ................. H02J 7/0018 |

* cited by examiner

ENERGY STORAGE SYSTEM

CROSS-REFERENCE TO RELATED APPLICATIONS

This application is a continuation of International Application No. PCT/CN2020/087918, filed on Apr. 29, 2020, the disclosure of which is hereby incorporated by reference in its entirety.

TECHNICAL FIELD

This application relates to the field of battery energy storage technologies, and in particular, to an energy storage system.

BACKGROUND

Because large-scale photovoltaic power generation and wind power generation results in intermittent power generation, and with a rapid decrease in battery costs, battery energy storage has been rapidly developed both on a power generation side and on a power consumption side. Installed capacity has also increased significantly. However, the voltage of a single battery module is usually relatively small, and even the voltage obtained through a serial connection of a plurality of battery modules cannot meet a requirement of large-scale energy storage. Therefore, to balance costs and performance, in the conventional technology, the plurality of battery modules are connected in series to obtain a plurality of battery clusters, the plurality of battery clusters are connected in parallel, and then the plurality of battery clusters share one direct current (DC)/alternating current (AC) inverter to implement energy exchange between storage batteries in the large-scale energy storage and a power grid.

Battery performance gradually deteriorates as usage time increases. The storage capacity of a battery decreases year by year as the service life of the battery increases, and a difference between storage capacities between different battery modules becomes increasingly significant. In addition, the battery modules are connected in series, so that charging and discharging time of the battery modules in a same battery cluster are the same, and further, a difference between the battery modules is greater. Therefore, to ensure safety and availability of any battery module in a single cluster of batteries, a limitation of a bottleneck battery module needs be considered, and the entire cluster of batteries is derated. This results in battery waste. In addition, simple parallel connection of the battery clusters causes inconsistent charging and discharging between the different battery clusters due to different battery internal resistances and battery port voltages. This limits the battery utilization rate. Therefore, how to resolve a difference between the batteries and maximize battery utilization is one of technical problems that need to be urgently resolved at present.

SUMMARY

This application provides an energy storage system which improves control flexibility of an energy storage module and enhances management effectiveness of the energy storage system.

According to a first aspect, this application provides an energy storage system, where the energy storage system includes at least one energy storage unit cluster. The energy storage unit cluster includes at least two energy storage modules, and the at least two energy storage modules are connected in series to each other, in other words, the energy storage unit cluster includes one or more energy storage modules connected in series. The energy storage system further includes a first bus, a second bus, and a centralized monitoring system of the energy storage unit cluster. The first bus herein may be an alternating current bus, or may be a direct current bus. The second bus is a direct current bus. The energy storage unit cluster is coupled to the first bus by using a first converter. One energy storage module in the energy storage unit cluster includes one energy storage element group and one DC/DC converter, and the energy storage element group is coupled to the second bus by using the DC/DC converter. The centralized monitoring system is connected to the energy storage unit cluster through a control bus, and is configured to control a DC/DC converter in any energy storage module in the energy storage unit cluster to output a compensation current to an energy storage element group end or draw a current from an energy storage element group end, so that energy storage element parameters of all energy storage modules in the energy storage unit cluster are consistent.

With reference to the first aspect, in a first possible implementation, one of the at least two energy storage modules further includes one battery management unit (BMU). The centralized monitoring system is connected to a BMU of each energy storage module in the energy storage unit cluster through a control bus, and a controller in a BMU of the any energy storage module controls the DC/DC converter to generate the compensation current to the energy storage element group end or draw the current from the energy storage element group end, so that the energy storage element parameters of all the energy storage modules in the energy storage unit cluster are consistent. In other words, the BMU in each battery module may control the DC/DC converter in the battery module to generate the compensation current to the energy storage element group end, or draw the current from the energy storage element group end, so that the energy storage element parameters of all the energy storage modules in the battery cluster are consistent. It may be understood that, that the energy storage element parameters of all the energy storage modules described herein are consistent may be that the energy storage element parameters of all the energy storage modules are the same (or equal), or a difference between the energy storage element parameters of all the energy storage modules is within a preset error range.

In this application, the BMU in each battery module in the energy storage unit cluster may be used for status detection and control of each energy storage element group and the DC/DC converter in the energy storage module, to better resolve a difference between all the energy storage modules. This implements efficient management and control of the energy storage system. In the energy storage system provided in this application, charging and discharging management may be implemented on each energy storage module in the energy storage system through the two buses, to resolve the difference between the energy storage modules, improve control flexibility of each energy storage module in the energy storage system, and enhance management effectiveness of the energy storage system.

With reference to the first aspect or the first possible implementation of the first aspect, in a second possible implementation, a first input/output end of the DC/DC converter in any energy storage module is coupled to an energy storage element group in the energy storage module, and second input/output ends of DC/DC converters in all the energy storage modules are connected in series to each other, and then are coupled to the second bus.

With reference to the first aspect or the first possible implementation of the first aspect, in a third possible implementation, a first input/output end of the DC/DC converter in any energy storage module is coupled to an energy storage element group in the energy storage module, and second input/output ends of DC/DC converters in all the energy storage modules are connected in parallel to the second bus.

Herein, when the DC/DC converter in the any energy storage module draws the current from the energy storage element group included in the energy storage module, the first input/output end of the DC/DC converter in the energy storage module is an input end, and a second input/output end of the DC/DC converter is an output end. When the DC/DC converter in the any energy storage module generates the compensation current for the energy storage element group, the first input/output end of the DC/DC converter in the energy storage module is an output end, and a second input/output end of the DC/DC converter in the energy storage module is an input end. In the energy storage system provided in this application, the second bus may be formed by connecting input/output ends of the DC/DC converters in all the energy storage modules in the energy storage unit cluster in series, or may be formed by connecting input/output ends of the DC/DC converters in all the energy storage modules in parallel. The second bus has various composition modes. This operation is flexible.

With reference to the first aspect, in a fourth possible implementation, the centralized monitoring system is integrated into the first converter.

In the energy storage system provided in this application, the centralized monitoring system may implement information interaction with the BMU in each energy storage module in the energy storage unit cluster, to better implement energy storage control of the energy storage system. When the centralized monitoring system is used as an independently placed circuit board or circuit module, information interaction may be implemented with a controller in the first converter, and the centralized monitoring system is connected to each energy storage module in the energy storage unit cluster through a control bus. A manner of information interaction between the centralized monitoring system and the energy storage module may alternatively be wireless communication, direct current power carrier communication, or the like. When the centralized monitoring system is integrated into the first converter as the independent circuit board or circuit module, a system structure of the energy storage system may be simplified. That the centralized monitoring system is integrated into the first converter as the independent circuit board or circuit module also is conducive to connection of the control bus.

With reference to the fourth possible implementation of the first aspect or the fourth possible implementation of the first aspect, in a fifth possible implementation, the any energy storage module in the energy storage unit cluster further includes a switch bridge arm, and the switch bridge arm includes a master control switch and a bypass switch. One end of the master control switch is connected to the energy storage element group in the energy storage module, and the other end of the master control switch is used as an input/output end of the energy storage module. One end of the bypass switch is connected to a first input/output end of the energy storage element group in the energy storage module, and the other end of the bypass switch is connected to a second input/output end of the energy storage module. Herein, the switch bridge arm in the any energy storage module may be integrated into the BMU in the energy storage module, and the BMU controls conduction or disconnection of the master control switch and the bypass switch in the switch bridge arm. When the energy storage system charges the energy storage element group, the first input/output end of the energy storage element group is an input end of the energy storage element group, and a second input/output end of the energy storage element group is an output end of the energy storage element group. When the energy storage element group is discharged, the first input/output end of the energy storage element group is an output end of the energy storage element group, and a second input/output end of the energy storage element group is an input end of the energy storage element group.

In this application, flexible control of a single energy storage module can be implemented by using a switch bridge arm in each energy storage module in combination with an energy management capability of the DC/DC converter in the energy storage module and an energy management capability of the first converter connected to the energy storage unit cluster in which the energy storage module is located. The operation is flexible.

With reference to any one of the fourth possible implementation of the first aspect to the fifth possible implementation of the first aspect, in a sixth possible implementation, the first converter includes a first port and a second port, the first port is coupled to the first bus, and the second port is coupled to an input/output end of the energy storage unit cluster; and the second bus is coupled to the first port.

With reference to any one of the fourth possible implementation of the first aspect to the fifth possible implementation of the first aspect, in a seventh possible implementation, the first converter includes a first port and a second port, the first port is coupled to the first bus, and the second port is coupled to an input/output end of the energy storage unit cluster; and the second bus is coupled to the first port by using a second converter.

With reference to any one of the fourth possible implementation of the first aspect to the fifth possible implementation of the first aspect, in an eighth possible implementation, the first converter includes a first port and a second port, the first port is coupled to the first bus, and the second port is coupled to an input/output end of the energy storage unit cluster; and the second bus is coupled to the second port.

With reference to any one of the fourth possible implementation of the first aspect to the fifth possible implementation of the first aspect, in a ninth possible implementation, the first converter includes a first port and a second port, the first port is coupled to the first bus, and the second port is coupled to an input/output end of the energy storage unit; and the second bus is coupled to the second port by using a second converter.

In this application, the first bus and the second bus may be connected in a plurality of manners, and selection of the first converter and the second converter may alternatively be adaptively adjusted based on a voltage conversion requirement and a connection manner between the first bus and the second bus. The operations are flexible.

With reference to any one of the seventh possible implementation of the first aspect to the ninth possible implementation of the first aspect, in a tenth possible implementation, the first bus is a direct current bus, and the first converter is a bidirectional DC/DC converter.

With reference to the tenth possible implementation of the first aspect, in an eleventh possible implementation, a circuit topology of the bidirectional DC/DC converter is a non-isolated circuit topology, and a boost ratio of the bidirectional DC/DC converter is determined based on a voltage of the first bus and a port voltage of the energy storage unit cluster.

With reference to any one of the eighth possible implementation of the first aspect to the ninth possible implementation of the first aspect, in a twelfth possible implementation, the first bus is an alternating current bus, and the first converter is a bidirectional DC/AC converter.

With reference to the twelfth possible implementation of the first aspect, in a thirteenth possible implementation, a circuit topology of the bidirectional DC/AC converter is a non-isolated circuit topology, and a boost ratio of the bidirectional DC/AC converter is determined based on a port voltage of the energy storage unit cluster and a voltage of the first bus.

In this application, a type of the first converter may be determined based on a current type of the first bus and a voltage conversion requirement between the voltage of the first bus and the port voltage of the energy storage unit cluster connected to the first converter. The operation is flexible and the first converter is applicable to a plurality of application scenarios.

With reference to the sixth possible implementation of the first aspect, in a fourteenth possible implementation, the first bus is a direct current bus, the second converter is a DC/DC converter, and a boost ratio of the second converter is determined based on a voltage of the first bus and a voltage of the second bus.

With reference to the sixth possible implementation of the first aspect, in a fifteenth possible implementation, the first bus is an alternating current bus, the second converter is a DC/AC converter, and a boost ratio of the second converter is determined based on a voltage of the first bus and a voltage of the second bus.

With reference to the eighth possible implementation of the first aspect, in a sixteenth possible implementation, the first bus is a direct current bus, the second converter is a DC/DC converter, and a boost ratio of the second converter is determined based on a port voltage of the energy storage unit cluster and a voltage of the second bus.

In this application, a type of the second converter may be selected based on a current type of the first bus and a voltage conversion requirement between the first bus and the port voltage of the energy storage unit cluster connected to the first converter. The operation is flexible and the second converter is applicable to a plurality of application scenarios.

With reference to the eighth possible implementation of the first aspect, in a seventeenth possible implementation, the first bus is an alternating current bus, the first converter is a bidirectional DC/AC converter, and the second converter is a DC/DC converter; and a boost ratio of the second converter is determined based on a port voltage of the energy storage unit cluster and a voltage of the second bus.

In this application, a type of the second converter may be selected based on a current type of the first bus, a voltage conversion requirement between the first bus and the port voltage of the energy storage unit cluster connected to the first converter, and a type of the first converter.

With reference to the first aspect, in an eighteenth possible implementation, the energy storage element parameter includes a charging/discharging time, a state of charge (SOC), a depth of discharge (DOD), a state of health (SOH), a port voltage, or the like.

In this application, through system energy scheduling of the first bus and the second bus, and collaborative control of converters in all the energy storage modules, it can be ensured that the energy storage element parameters of all the energy storage modules are consistent, a capability of the energy storage module is fully utilized, and a utilization rate of the energy storage module is increased.

With reference to the first aspect to the fourth possible implementation of the first aspect, in a nineteenth possible implementation, the DC/DC converter in the any energy storage module is a unidirectional DC/DC converter. Herein, an energy direction of the unidirectional DC/DC converter is from the energy storage element group in the any energy storage module to the second bus.

With reference to the nineteenth possible implementation of the first aspect, in a twentieth possible implementation, a maximum charging current of the energy storage unit cluster is determined based on a capacity of a first energy storage module in the energy storage unit cluster. Herein, the first energy storage module is an energy storage module with a maximum capacity in the energy storage modules included in the energy storage unit cluster. A maximum discharging current of the energy storage unit cluster is determined based on a capacity of a second energy storage module in the energy storage unit cluster. Herein, the second energy storage module is an energy storage module with a minimum capacity in the energy storage modules included in the energy storage unit cluster.

In this application, when charging and discharging management is performed on the energy storage module, maximum charging and discharging currents of the energy storage unit cluster may be limited based on capacities of all the energy storage modules in the energy storage unit cluster. The maximum charging and discharging currents of the energy storage unit cluster are limited, to ensure that battery charging times of all energy storage element groups in the entire energy storage unit cluster are consistent. In this way, energy balancing management of all the energy storage modules in the energy storage unit cluster can be implemented.

With reference to the first aspect to the fourth possible implementation of the first aspect, in a twenty-first possible implementation, the DC/DC converter in the any energy storage module is a unidirectional DC/DC converter. Herein, an energy direction of the unidirectional DC/DC converter is from the second bus to the energy storage element group in the any energy storage module.

With reference to the twenty-first possible implementation of the first aspect, in a twenty-second possible implementation, a maximum discharging current of the energy storage unit cluster is determined based on a capacity of a first energy storage module in the energy storage unit cluster, and the first energy storage module is an energy storage module with a maximum capacity in the energy storage modules included in the energy storage unit cluster. A maximum charging current of the energy storage unit cluster is determined based on a capacity of a second energy storage module in the energy storage unit cluster, and the second energy storage module is an energy storage module with a minimum capacity in the energy storage modules included in the energy storage unit cluster.

In this application, because a power direction of the converter in each energy storage module is adjusted, a charging/discharging management manner of each energy storage module in the energy storage system may also be adaptively adjusted. The operation is flexible.

With reference to any one of the first aspect to the twenty-second possible implementation of the first aspect, in a twenty-third possible implementation, the energy storage system includes a plurality of energy storage unit clusters, and in this case, the plurality of energy storage unit clusters in the energy storage system share the second bus.

In this application, the second bus independently forms a bus, to implement energy balancing management between different energy storage modules in a single energy storage unit cluster. When there are the plurality of energy storage unit clusters in the energy storage system, a same second bus may alternatively be constructed between different energy storage unit clusters, so that energy between the different energy storage modules in the single energy storage unit cluster and energy between energy storage modules in different energy storage unit clusters can be balanced. The operation is flexible.

With reference to any one of the first aspect to the twenty-third possible implementation of the first aspect, in a twenty-fourth possible implementation, the voltage of the second bus is between 40 V and 100 V, or between 400 V and 500 V, or between 900 V and 1200 V.

With reference to any one of the first aspect to the twenty-fourth possible implementation of the first aspect, in a twenty-fifth possible implementation, the first bus is coupled to a photovoltaic power generation system by using a unidirectional DC/DC converter.

With reference to any one of the first aspect to the twenty-fourth possible implementation of the first aspect, in a twenty-sixth possible implementation, the first bus is coupled to an alternating current load or an alternating current power grid by using a bidirectional DC/AC converter.

The energy storage system provided in this application may be adapted to a plurality of different application scenarios. The first bus may implement energy interaction between a direct current and a power grid alternating current by using different converters, and may also implement efficient use of photovoltaic energy. The energy storage system has a wide application scope.

According to a second aspect, this application provides an energy storage system, where the energy storage system includes at least one energy storage unit cluster, the energy storage unit cluster includes at least two energy storage modules, and the at least two energy storage modules are connected in series, in other words, the energy storage unit cluster includes one or more energy storage modules connected in series. The energy storage system further includes a first bus, a second bus, and a centralized monitoring system of the energy storage unit cluster. The first bus herein may be a direct current bus or an alternating current bus. The second bus is an alternating current bus. The energy storage unit cluster is coupled to the first bus by using a first converter. One energy storage module includes one BMU, one energy storage element group, and one DC/AC converter, and the energy storage element group is coupled to the second bus by using the DC/AC converter. The centralized monitoring system is connected to a BMU of each energy storage module in the energy storage unit cluster through a control bus, and a controller in a BMU of any energy storage module controls a DC/AC converter to generate a compensation current to an energy storage element group end or draw a current from an energy storage element group end, so that energy storage element parameters of all the energy storage modules in the energy storage unit cluster are consistent. In other words, the BMU in each battery module may control the DC/AC converter in the battery module to generate the compensation current to the energy storage element group end in each energy storage module or draw the current from the energy storage element group end, so that the energy storage element parameters of all the energy storage modules in the battery cluster are consistent.

The energy storage system provided in this application is also applicable to a scenario in which the second bus is an alternating current bus. Correspondingly, a converter in each energy storage module in the energy storage unit cluster may be adaptively adjusted to a DC/AC converter based on a change in the application scenario in which the second bus is an alternating current bus. The operation is flexible.

With reference to the second aspect, in a first possible implementation, a first input/output end of the DC/AC converter in any energy storage module is coupled to an energy storage element group in the energy storage module; and second input/output ends of DC/AC converters in all the energy storage modules are connected in series to each other, and then are coupled to the second bus.

With reference to the second aspect, in a second possible implementation, a first input/output end of the DC/AC converter in any energy storage module is coupled to an energy storage element group in the energy storage module, and second input/output ends of DC/AC converters in all the energy storage modules are connected in parallel to the second bus.

In the energy storage system provided in this application, the second bus may be formed by connecting input/output ends of the DC/AC converters in all the energy storage modules in the energy storage unit cluster in series, or may be formed by connecting input/output ends of DC/AC converters in all the energy storage modules in parallel. The second bus has various composition modes. The operation is flexible.

With reference to the first possible implementation of the second aspect or the second possible implementation of the second aspect, in a third possible implementation, the centralized monitoring system is integrated into the first converter connected to the energy storage unit cluster.

In this application, the BMU in each battery module in the energy storage unit cluster may be used for status detection and control of each energy storage element group and the DC/AC converter in the energy storage module, to better resolve a difference between all the energy storage modules. This implements efficient management and control of the energy storage system.

With reference to the third possible implementation of the second aspect, in a fourth possible implementation, the energy storage module further includes a switch bridge arm, and the switch bridge arm includes a master control switch and a bypass switch. One end of the master control switch is connected to the energy storage element group in the energy storage module, and the other end of the master control switch is used as an input/output end of the energy storage module. One end of the bypass switch is connected to a first input/output end of the energy storage element group in the energy storage module, and the other end of the bypass switch is connected to a second input/output end of the energy storage module.

In this application, flexible control of a single energy storage module can be implemented by using a switch bridge arm in each energy storage module in combination with an energy management capability of the DC/AC converter in the energy storage module and an energy management capability of the first converter connected to the energy storage unit cluster in which the energy storage module is located. The operation is flexible.

With reference to the third possible implementation of the second aspect or the fourth possible implementation of the second aspect, in a fifth possible implementation, the first converter includes a first port and a second port, the first port is coupled to the first bus, and the second port is coupled to an input/output end of the energy storage unit cluster; and the second bus is coupled to the first port.

With reference to the third possible implementation of the second aspect or the fourth possible implementation of the second aspect, in a sixth possible implementation, the first converter includes a first port and a second port, the first port is coupled to the first bus, and the second port is coupled to an input/output end of the energy storage unit cluster; and the second bus is coupled to the first port by using a second converter.

With reference to the third possible implementation of the second aspect or the fourth possible implementation of the second aspect, in a seventh possible implementation, the first converter includes a first port and a second port, the first port is coupled to the first bus, and the second port is coupled to an input/output end of the energy storage unit; and the second bus is coupled to the second port by using a second converter.

In this application, the first bus and the second bus may be connected in a plurality of manners. The operation is flexible.

With reference to the third possible implementation of the second aspect or the fourth possible implementation of the second aspect, in an eighth possible implementation, the foregoing energy storage element parameter includes one of a charging/discharging time, a state of charge (SOC), a depth of discharge (DOD), a state of health (SOH), and a port voltage.

In this application, through system energy scheduling of the first bus and the second bus, and collaborative control of converters in all the energy storage modules, it can be ensured that the energy storage element parameters of all the energy storage modules are consistent, a capability of the energy storage module is fully utilized, and a utilization rate of the energy storage module is increased.

DESCRIPTION OF EMBODIMENTS

An energy storage system provided in this application is applicable to a plurality of types of power generation devices such as a photovoltaic power generation device or a wind power generation device, and may be applied to the automotive field, and the like. The energy storage system provided in this application is applicable to energy storage of different types of energy storage elements. Herein, the different types of energy storage elements may include a lithium ion battery, a lead-acid battery (or referred to as a lead-acid battery), a supercapacitor (also referred to as an electrochemical capacitor), and the like. A specific type of the energy storage element is not specifically limited in this application. For ease of description, the energy storage system provided in this application is described by using a battery as an example.

Figure 1:
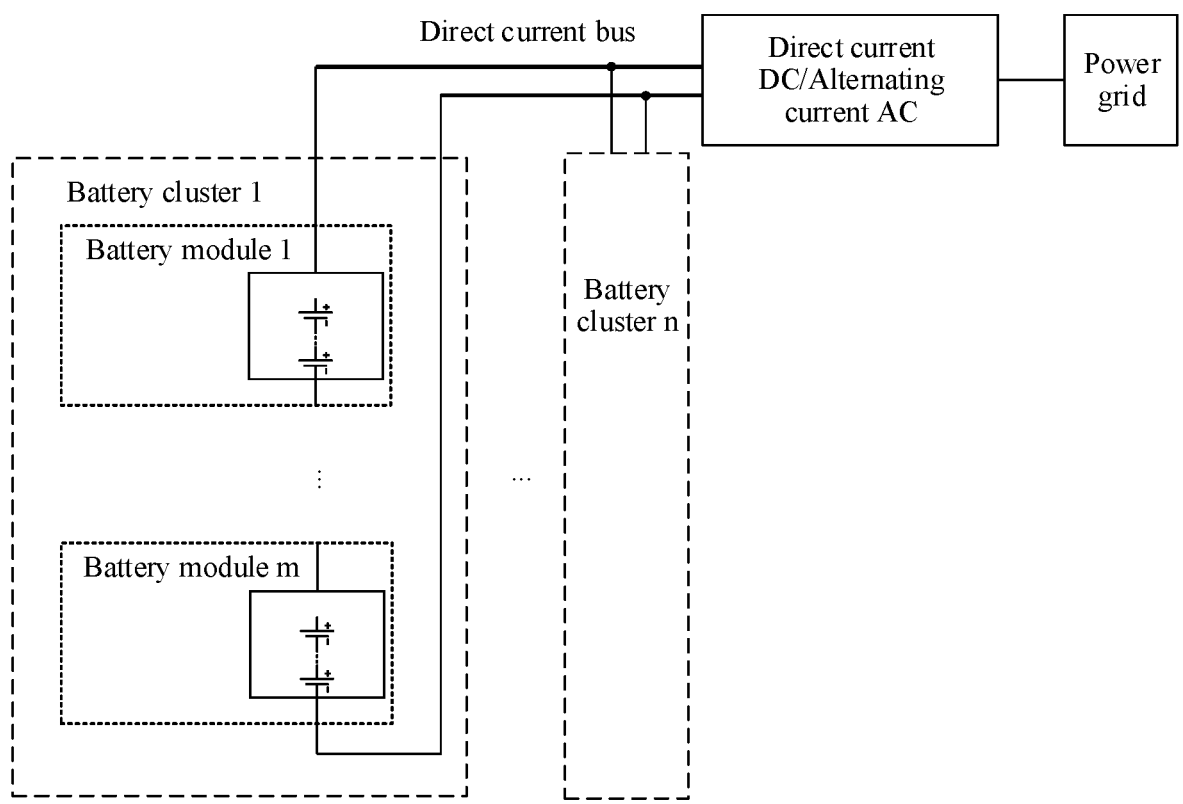
FIG. 1 is a schematic structural diagram of an energy storage system.
Figure 2:
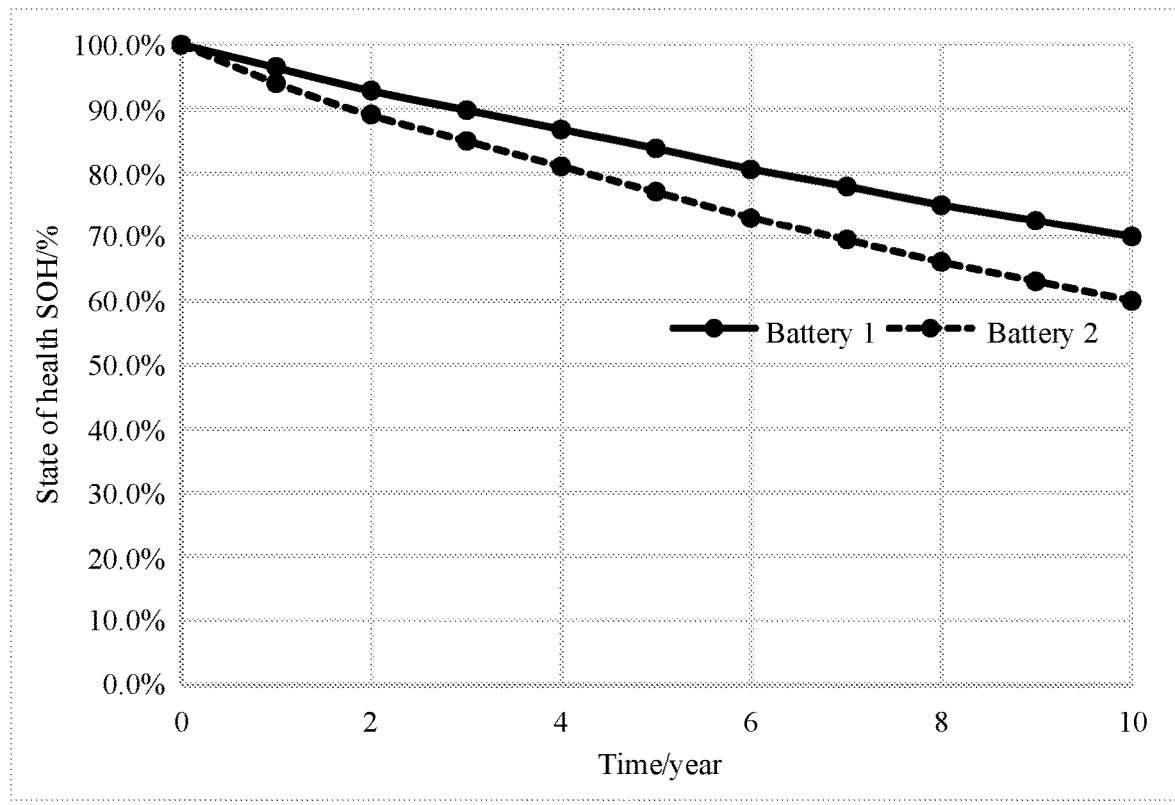
FIG. 2 is a schematic curve diagram of a relationship between a state of health of and a service life that are of a battery.

Currently, for large-scale photovoltaic power generation or wind power generation, a power grid voltage is usually relatively high, for example, an alternating voltage from 400 V to 800 V. Consequently, a direct current-side voltage ranges from 550 V to 1500 V. However, a voltage of a single battery module is usually relatively small. For example, the voltage of the single battery module is usually less than 60 V. Therefore, to meet a power grid voltage requirement, a plurality of battery modules are usually directly connected in series to obtain a high voltage. FIG. 1 is a schematic structural diagram of an energy storage system. In the energy storage system shown in FIG. 1, one battery module (for example, a battery module 1) may be one battery pack, and one battery pack may include one or more battery units (a voltage of the battery unit is usually between 2.5 V and 4.2 V) connected in series and connected in parallel, to form a minimum energy storage and management unit. For ease of description, the following uses the battery module as an example for description. A port voltage of a single battery module is relatively small. Therefore, a plurality of battery modules (for example, the battery module 1 to a battery module m, where m is a positive integer) are directly connected in series to obtain a required port voltage (for example, an output voltage of a battery cluster 1); and the plurality of battery modules are connected in parallel to obtain a plurality of battery clusters (for example, the battery cluster 1 to a battery cluster n, where n is an integer) to realize required stored energy, and the plurality of battery clusters are connected in parallel to a direct current bus, and then share one inverter (for example, a DC/AC converter) to implement energy interaction between an energy storage battery and a power grid. However, as a service life increases, a state of health (state of health, SOH) of the battery deteriorates continuously, and a storage capacity in the battery also decreases year by year. In addition, health degree dispersion of different batteries is increasingly significant due to individual differences of the batteries. FIG. 2 is a schematic diagram of a relationship between a state of health and a service life that are of a battery. Health degrees of a battery 1 and a battery 2 both gradually decrease as service lives of the batteries increase. In the $10^{th}$ year, the SOH of the battery 1 is 70%, the SOH of the battery 2 is 60%, and a difference between the health degree of the battery 1 and the health degree of the battery 2 is 10%.

Figure 3:
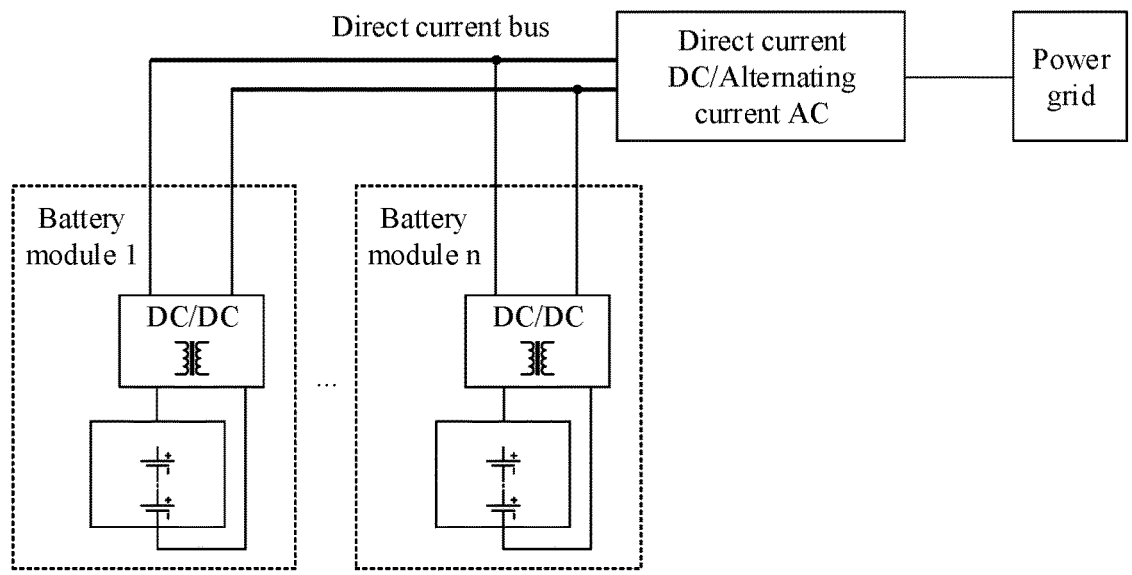
FIG. 3 is another schematic structural diagram of an energy storage system.

In some feasible implementations, refer to FIG. 3. FIG. 3 is another schematic structural diagram of an energy storage system. To resolve a difference between batteries, a plurality of battery modules (for example, a battery module 1 to a battery module n) may be connected in parallel to a same direct current bus, to obtain a parallel-type energy storage system. In the energy storage system shown in FIG. 3, one DC/DC converter may be introduced into each of the battery modules (for example, the battery module 1 to the battery module n), and output ends of DC/DC converters in all the battery modules are connected in parallel to the same direct current bus. Then, a bidirectional DC/AC converter is used to achieve voltage matching and energy interaction between the direct current bus and an alternating current power grid. In the energy storage system shown in FIG. 3, because each battery module is followed by one DC/DC converter to implement energy management, independent control of each battery module can be implemented by using the DC/DC converter followed by the battery module. The operation is flexible and a maximum utilization rate of each battery module can also be ensured.

In a large-scale photovoltaic power generation application, a wind power generation application, or a pure energy storage application, a power grid voltage is usually relatively high. To meet a power grid voltage requirement, in the energy storage system shown in FIG. 3, a boost ratio of the DC/DC converter is very high. For example, it is assumed that a port voltage of the battery module is 50 V and a voltage of the direct current bus is 1200 V. In this case, in the energy storage system shown in FIG. 3, the boost ratio of the DC/DC converter is 24. In this case, due to the high boost ratio of the DC/DC converter, the DC/DC converter is generally implemented by using an isolated bidirectional DC/DC converter. However, converter efficiency of the isolated bidirectional DC/DC converter is low, which reduces energy storage efficiency of the energy storage system. At the same time, due to high costs of the isolated bidirectional DC/DC converter, costs of the energy storage system also increase. In addition, parallel connection of output ports of all the battery energy storage modules also increases field wiring difficulty and delivery difficulty of the energy storage system. This application provides an energy storage system, to improve control flexibility of each energy storage module in the energy storage system, increase an effective utilization rate of the energy storage module, and enhance management effectiveness of the energy storage module.

The following describes, with reference to FIG. 4a to FIG. 9c, the energy storage system provided in this application, energy storage control manners of the energy storage system, and application scenarios of the energy storage system by using examples.

Figure 4A:
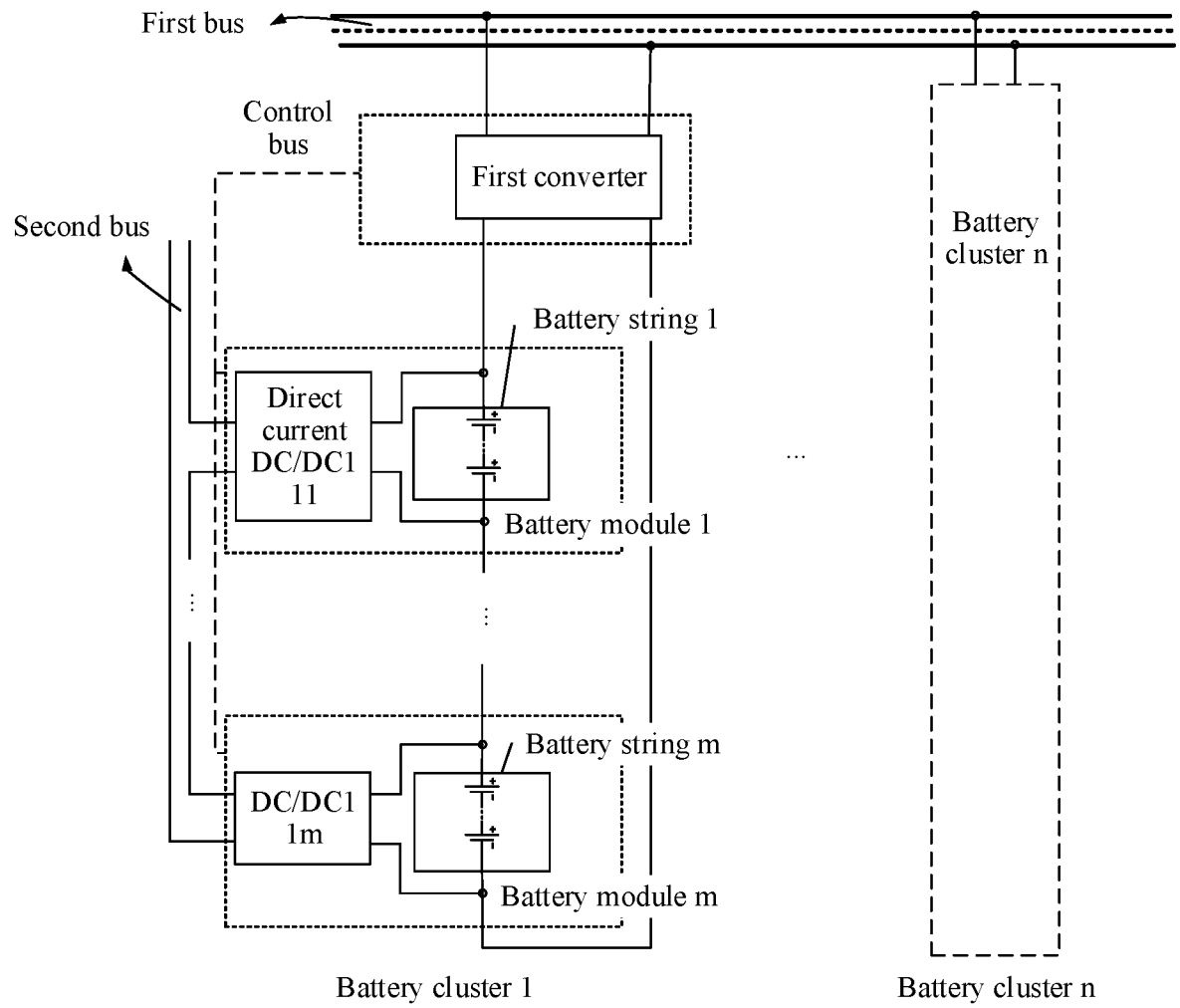
FIG. 4a is a schematic structural diagram of an energy storage system according to this application.

Energy Storage System Structure 1:

FIG. 4a is a schematic structural diagram of the energy storage system according to this application. The energy storage system provided in this application includes one or more energy storage unit clusters (namely, at least one energy storage unit cluster). One energy storage unit cluster may include at least two energy storage modules, and the energy storage modules are connected in series. In other words, one energy storage unit cluster may include at least two energy storage modules connected in series. In this application, various types of energy storage elements are described by using a battery as an example, the energy storage unit cluster is described by using a battery cluster as an example, and the energy storage module is described by using a battery module as an example. As shown in FIG. 4a, in the energy storage system provided in this application, the one or more energy storage unit clusters are described by using a battery cluster 1 to a battery cluster n as an example, where n is an integer. As shown in FIG. 4a, the energy storage system provided in this application further includes a first bus and a second bus. The first bus is a primary power bus. The first bus may be a direct current bus, or may be an alternating current bus, which may be specifically determined based on a requirement of an actual application scenario. The second bus is an auxiliary control bus. In this application, to simplify control, the second bus may be a direct current bus. Optionally, the second bus may alternatively be an alternating current bus. This may be specifically determined based on an actual application scenario, and is not limited herein. For ease of description, in each schematic structural diagram of the energy storage system provided in this application, an example in which the second bus is the direct current bus is used for description.

As shown in FIG. 4a, in the energy storage system provided in this application, each of the battery cluster 1 to the battery cluster n may be coupled to the first bus by using a first converter, and one battery cluster is coupled to the first bus by using one first converter. Herein, the first converter is a primary power converter. The first converter may be a DC/DC converter, or may be a DC/AC converter, which may be specifically determined based on a requirement of an actual application scenario. The first converter may include a first port and a second port, where the first port is coupled to the first bus, and the second port is coupled to an input/output end of the battery cluster. For ease of description, the following uses an example in which the battery cluster 1 is coupled to the first bus for description. The battery cluster 1 may be coupled to the first bus by using one first converter (for example, a converter 1). As shown in FIG. 4a, the battery cluster 1 is obtained by connecting a battery module 1 to a battery module m in series. An input/output end of the battery cluster 1 is a first input/output end of the battery module 1, a second input/output end of the battery module 1 is connected to a battery module 2, a second port of the converter 1 is coupled to the first input/output end of the battery module 1, and a first port of the converter 1 is coupled to the first bus. When the energy storage system charges each battery module in the battery cluster 1, the first input/output end of the battery module 1 is an input end of the battery module 1, and the second input/output end of the battery module 1 is an output end of the battery module 1. When each battery module in the battery cluster 1 is discharged, the first input/output end of the battery module 1 is an output end of the battery module 1, and the second input/output end of the battery module 1 is an input end of the battery module 1. That is, whether the first input/output end and/or the second input/output end of the battery module 1 is used as the input end or the output end of the battery module 1 may be determined based on an actual application scenario. This is not limited herein.

Optionally, in some feasible implementations, it is assumed that the first bus is the direct current bus, a direct current voltage at the first bus end is 1200 V, a direct current voltage of each battery module in the battery cluster 1 is 50 V, and a quantity of battery modules connected in series in the battery cluster 1 is 20. In this case, a port voltage of the battery cluster 1 is 1000 V (direct current), in other words, a direct current voltage of the second port of the first converter (namely, the primary power converter, for example, the converter 1) is 1000 V. The converter 1 is a bidirectional DC/DC converter, and matches the direct current voltage 1000 V and the direct current voltage 1200 V. In this case, a boost ratio of the converter 1 is 1.2 (namely, 1200 V/1000 V), to be specific, the boost ratio of the converter 1 is determined by the voltage of the first bus and the port voltage of the battery cluster 1. It is assumed that the first bus is the alternating current bus, an alternating current voltage of the first bus is 600 V, a direct current voltage of a battery module in the battery cluster 1 is also 50 V, and a quantity of battery modules connected in series in the battery cluster 1 is 20. In this case, a port voltage of the battery cluster 1 is 1000 V (direct current), in other words, a direct current voltage of the second port of the converter 1 is 1000 V. The converter 1 is a bidirectional DC/AC converter, and matches the port voltage 1000 V (direct current) of the battery cluster 1 and the voltage 600 V (alternating current) of the first bus. Therefore, it can be obtained that a boost ratio of the converter 1 is 1.67 (namely, 1000 V/600 V), to be specific, the boost ratio of the converter 1 is determined by the port voltage of the battery cluster 1 and the voltage of the first bus. Herein, to implement highly efficient power conversion, and a boost ratio requirement of the first converter is not high, a circuit topology used by the first converter may be a non-isolated circuit topology. For example, when the first converter is the DC/DC converter, a flying capacitor multilevel circuit, a three-level boost circuit, a four-switch buck-boost circuit, or the like may be selected for the circuit topology of the first converter, which may be specifically determined based on a requirement of an actual application scenario. This is not limited herein. When the first converter is a bidirectional DC/AC converter, a neutral point clamped T-type three-level circuit, a neutral point clamped circuit (NPC), an active neutral point clamped circuit (ANPC), a flying capacitor multilevel circuit, or the like may be selected for the circuit topology of the first converter, which may be specifically determined based on an actual scenario. This is not limited herein. In addition, a port voltage of the energy storage element varies with an energy storage capacity. For example, the port voltage of the battery cluster 1 changes with the quantity of battery modules connected in series in the battery cluster 1. When the quantity of battery modules connected in series in the battery cluster 1 changes greatly, the port voltage of the battery cluster 1 also changes greatly. For example, when two battery modules are connected in series in the battery cluster 1, the port voltage of the battery cluster 1 is 100 V. When 30 battery modules are connected in series in the battery cluster 1, the port voltage of the battery cluster 1 is 1500 V, namely, an upper limit voltage of a low-voltage electrical system. Therefore, the port voltage of the battery cluster 1 may be an output voltage in a wide range, for example, 100 V to 1500 V. To match a change range of the port voltage of the battery cluster 1, the first converter may be designed to have a wide range of an input/output capability, which may be specifically determined based on an actual application scenario. This is not limited herein.

In the energy storage system provided in this application, when the second bus is the direct current bus, one battery module may include at least one energy storage element group and one DC/DC converter, and an energy storage element group in each battery module may be coupled to the second bus by using a DC/DC converter in the battery module. When the second bus is the alternating current bus, one battery module may include at least one energy storage element group and one DC/AC converter, and an energy storage element group in each battery module may be coupled to the second bus by using a DC/AC converter in the battery module. In this application, a quantity (namely, n) of battery clusters in the energy storage system may be determined based on an energy storage capacity of the energy storage system in actual application. This is not limited herein. An energy storage element group (for example, a battery string) in one battery module may include several energy storage elements (for example, battery units) connected in series and connected in parallel, to form a minimum capability storage and management unit, for example, a battery string 1 in the battery module 1 to a battery string m in the battery module m shown in FIG. 4a. Each battery module in the battery cluster 1 may interact with the converter 1 through a control bus, to implement management and control of the energy storage system. For ease of description, an example in which the DC/DC converter in each battery module may be a converter DC/DC1 is used for description. For example, DC/DC converters in the battery module 1 to the battery module m may be a converter DC/DC1 1*l* to a converter DC/DC1 1*m*. As shown in FIG. 4a, the battery module 1 may include at least the battery string 1 and the converter DC/DC1 1*l*, and the battery module m may include at least the battery string m and the converter DC/DC1 1*m*. A first input/output end of a converter DC/DC1 1*l* in any battery module (for example, the battery module 1 in the battery cluster 1) may be coupled to an energy storage element group (for example, the battery string 1) in the battery module 1, and second input/output ends of converters DC/DC1 in all the battery modules in the battery cluster 1 are connected in series to the second bus. In other words, the second input/output ends of the converters DC/DC1 of all the battery modules in the battery cluster 1 are connected in series to form the second bus. When a converter DC/DC1 in the any battery module draws a current from a battery string included in the battery module, a first input/output end of the converter DC/DC1 in the battery module is an input end, and a second input/output end of the converter DC/DC1 is an output end. When a converter DC/DC1 in the any battery module generates a compensation current for a battery string, a first input/output end of the converter DC/DC1 in the battery module is an output end, and a second input/output end of the converter DC/DC1 in the battery module is an input end. In a specific implementation, whether the first input/output end and/or the second input/output end of the converter DC/DC1 is the input end or the output end may be determined based on an actual application scenario. This is not limited herein.

Optionally, in some feasible implementations, when the second bus is the alternating current bus, the DC/AC converters in the battery module 1 to the battery module m may be a converter DC/AC1 1*l* to a converter DC/AC1 1*m*. A first input/output end of a converter DC/AC1 (for example, the DC/AC1 1*l*) in any battery module (for example, the battery module 1 in the battery cluster 1) may be coupled to an energy storage element group (for example, the battery string 1) in the battery module 1, and second input/output ends of converters DC/AC1 in all the battery modules in the battery cluster 1 are connected in series to each other, and then are coupled to the second bus. When a converter DC/AC1 in the any battery module draws a current from a battery string included in the battery module, a first input/output end of the converter DC/AC1 in the battery module is an input end, and a second input/output end of the converter DC/AC1 is an output end. When a converter DC/AC1 in the any battery module generates a compensation current for a battery string, a first input/output end of the converter DC/AC1 in the battery module is an output end, and a second input/output end of the converter DC/AC1 in the battery module is an input end. In a specific implementation, whether the first input/output end and/or the second input/output end of the converter DC/AC1 is the input end or the output end may be determined based on an actual application scenario. This is not limited herein.

Figure 4B:
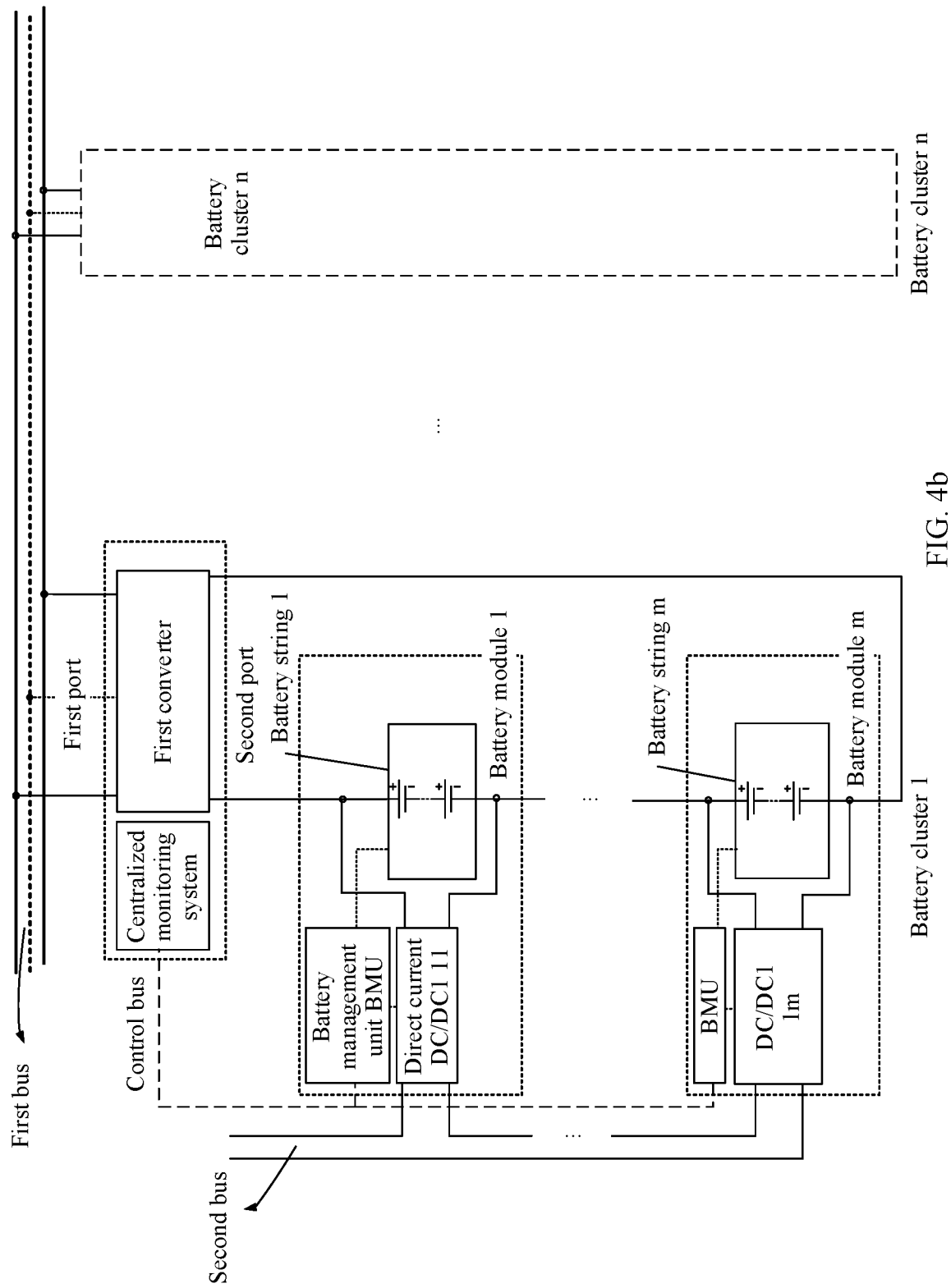
FIG. 4b is another schematic structural diagram of an energy storage system according to this application.

Energy Storage System Structure 2:

FIG. 4*b* is another schematic structural diagram of the energy storage system according to this application.

In some feasible implementations, to manage a single battery cluster, a centralized monitoring system may be added for each battery cluster, where one battery cluster corresponds to one centralized monitoring system. For example, a battery cluster 1 may correspond to a centralized monitoring system in a converter 1. For ease of description, a centralized monitoring system 1 may be used as an example for description. The centralized monitoring system corresponding to the single battery cluster may be designed as a separate circuit board or circuit module. The circuit board or circuit module may be independently placed in the energy storage system, or may be integrated into a first converter. Optionally, when the centralized monitoring system corresponding to the single battery cluster is used as an independently placed circuit module, the centralized monitoring system corresponding to the single battery cluster implements information interaction with a controller in the first converter, and the centralized monitoring system is connected to each battery module in the battery cluster through a control bus. In a specific implementation, a manner of information interaction between the centralized monitoring system and the battery module may alternatively be wireless communication, direct current power carrier communication, or the like, which may be specifically determined based on an actual application scenario. The operation is flexible. Optionally, when the centralized monitoring system of the single battery cluster is integrated into the first converter connected to the battery cluster as the separate circuit board or circuit module, a system structure of the energy storage system may be simplified. In addition, because the single battery cluster is usually installed to the first converter in a short distance, integrating the centralized monitoring system of the single battery cluster into the first converter facilitates connection of the control bus.

Optionally, refer to FIG. 4*b*. In some feasible implementations, to implement status monitoring and control of battery modules, one battery management unit (battery management unit, BMU) may be added to each battery module in the single battery cluster. The BMU may include a battery management module, a corresponding communication module, a corresponding power supply module, and the like, and is configured to implement status detection and control of each energy storage element group (namely, each battery string) in the battery module. The BMU in each battery module may control a DC/DC converter in the battery module to generate a compensation current to an energy storage element group end in the energy storage module or draw a current from an energy storage element group end, so that energy storage element parameters of all the energy storage modules in the battery cluster are consistent. The BMU in each battery module in the battery cluster may interact information with the centralized monitoring system in the first converter connected to the battery cluster, to implement management and control of the energy storage system.

Figure 4C:
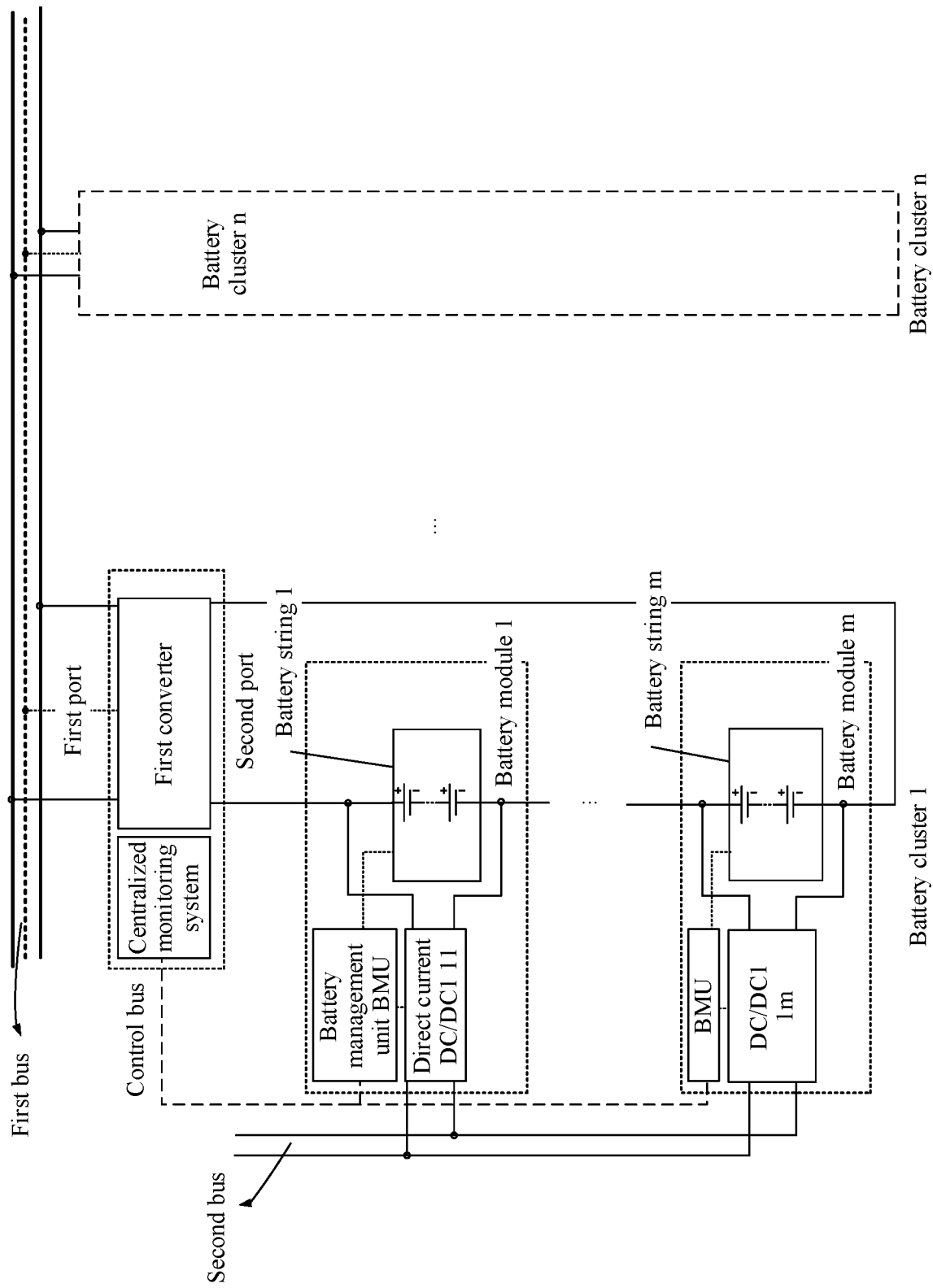
FIG. 4c is another schematic structural diagram of an energy storage system according to this application.

Energy Storage System Structure 3:

FIG. 4*c* is another schematic structural diagram of the energy storage system according to this application.

In some feasible implementations, when a second bus is a direct current bus, second input/output ends of converters DC/DC1 included in all battery modules in any battery cluster (for example, a battery cluster 1) may alternatively be coupled in parallel to the second bus. In other words, the second input/output ends of the converters DC/DC1 included in all the battery modules in the battery cluster 1 may be connected in parallel to form the second bus. It may be understood that when the second bus is an alternating current bus, second input/output ends of converters DC/AC1 included in all the battery modules in the any battery cluster may alternatively be coupled in parallel to the second bus. In other words, the second input/output ends of the converters DC/AC1 included in all the battery modules in the any battery cluster may be connected in parallel to form the second bus.

Figure 4D:
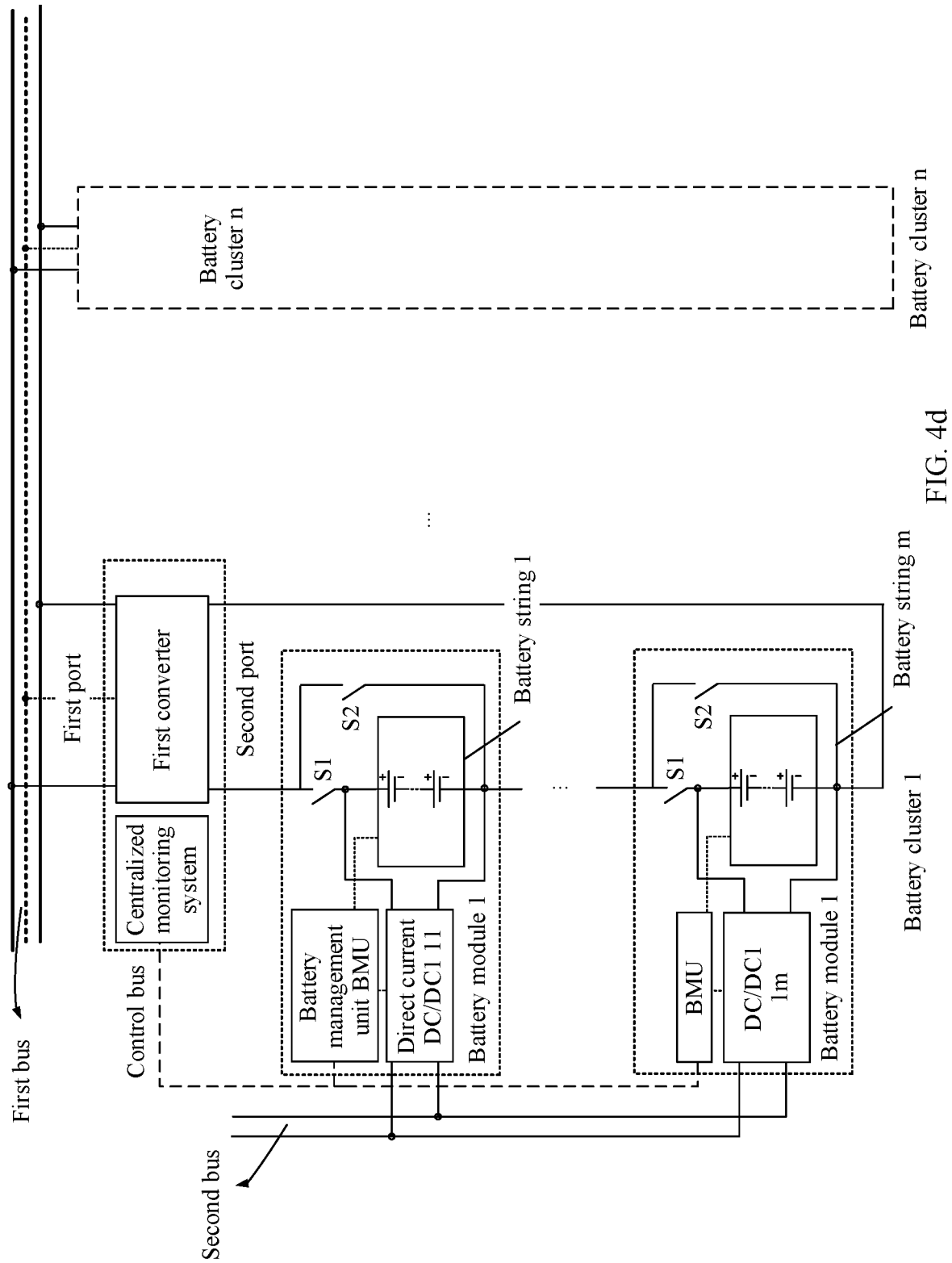
FIG. 4d is another schematic structural diagram of an energy storage system according to this application.

Energy Storage System Structure 4:

FIG. 4*d* is another schematic structural diagram of the energy storage system according to this application.

In some feasible implementations, each of battery modules (for example, a battery module 1 to a battery module m) in any battery cluster (for example, a battery cluster 1) of the energy storage system may further include a switch bridge arm including a master control switch and a bypass switch. One battery module includes one switch bridge arm. In any battery module, one end of a master control switch is connected to a battery string in the battery module, and the other end of the master control switch is used as an input/output end of the battery module. In the any battery module, one end of a bypass switch is connected to a first input/output end of the battery string in the energy storage module, and the other end of the bypass switch is connected to a second input/output end of the battery module. Optionally, a switch bridge arm in the any battery module may be integrated into a BMU in the battery module, and the BMU controls conduction or disconnection of the master control switch and the bypass switch in the switch bridge arm. This may be specifically determined based on an actual application scenario, and is not limited herein. For example, in the battery cluster 1, the battery module 1 may include a switch bridge arm, and the switch bridge arm includes a master control switch S1 and a bypass switch S2. One end of the master control switch S1 is connected to a battery string 1, and the other end of the master control switch S1 is used as an input/output end of the battery module 1. One end of the bypass switch S2 is connected to a first input/output end of the battery string 1, and the other end of the bypass switch S2 is connected to a second input/output end of the battery string 1. When the energy storage system charges the battery string 1, the first input/output end of the battery string 1 is an input end of the battery string 1, and the second input/output end of the battery string 1 is an output end of the battery string 1. When the battery string 1 is discharged, the first input/output end of the battery string 1 is an output end of the battery string 1, and the second input/output end of the battery string 1 is an input end of the battery string 1. Whether an input/output end of each battery string is used as an input end or an output end may be specifically determined based on a requirement of an actual application scenario. This is not limited herein. The switch bridge arm in the battery module 1 may be controlled by a BMU in the battery module 1, to be specific, the BMU in the battery module 1 controls connection or disconnection of the master control switch S1 and the bypass switch S2. For example, in the battery module 1, when the master control device S1 is connected and the bypass device S2 is disconnected, the battery module 1 is connected to the battery cluster 1 to implement high-power charge/discharge control. When the master control device S1 is disconnected and the bypass device S2 is connected, the battery module 1 is removed from the battery cluster 1, and the battery module 1 does not perform high-power charge/discharge control. Flexible control of a single battery module can be implemented by using a switch bridge arm in a battery module in combination with an energy management capability of a DC/DC converter in the battery module and an energy management capability of a first converter connected to a battery cluster in which the battery module is located. The operation is more flexible.

Figure 5:
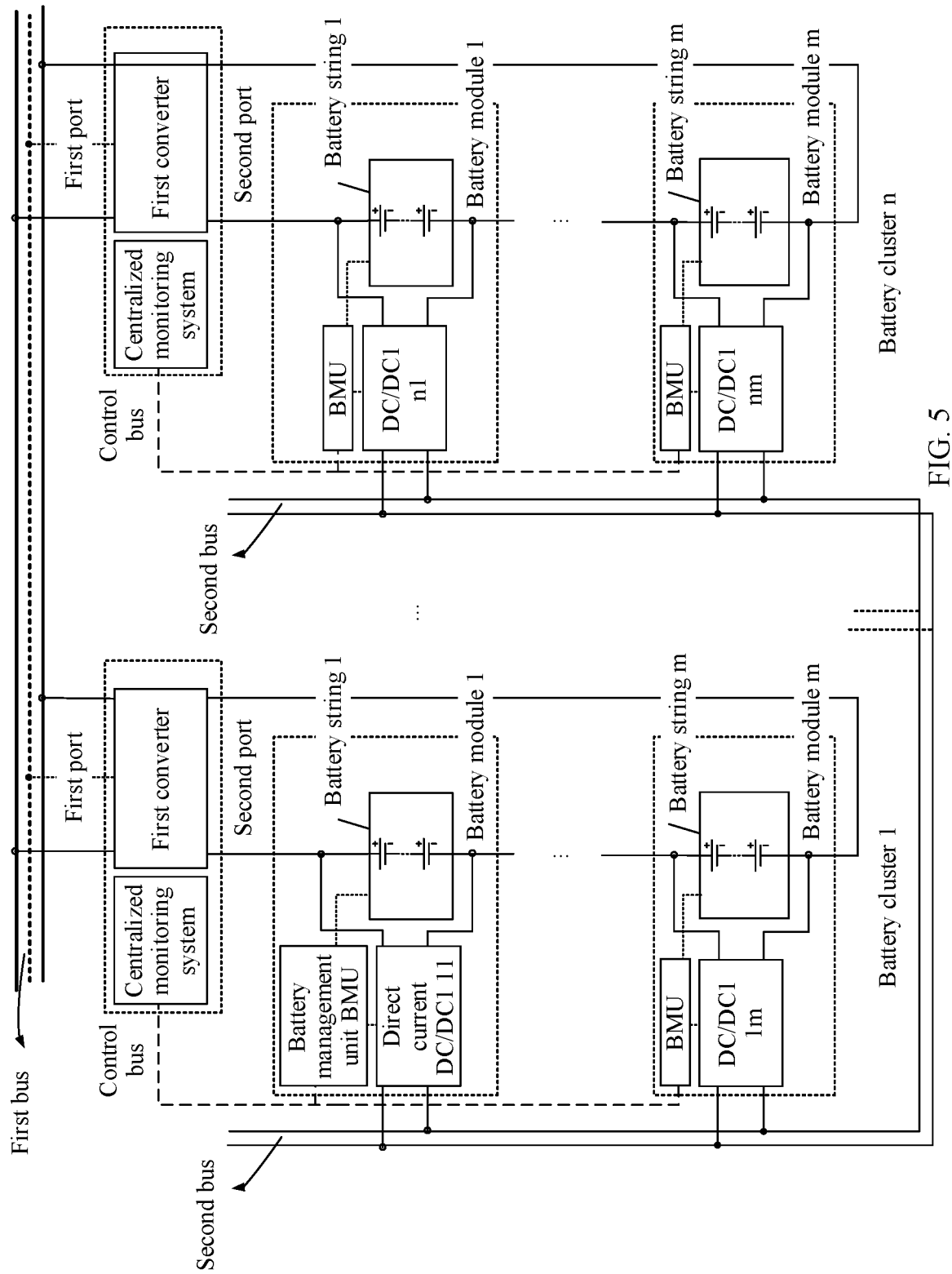
FIG. 5 is another schematic structural diagram of an energy storage system according to this application.

Energy Storage System Structure 5:

FIG. 5 is another schematic structural diagram of the energy storage system according to this application.

In some feasible implementations, if there are a plurality of battery clusters in the energy storage system, for example, a battery cluster 1 to a battery cluster n, the energy storage system may construct one second bus for one battery cluster, and different battery clusters use different second buses, to implement energy balancing management between different battery modules in a single battery cluster. Second input/output ends of DC/DC converters (for example, a converter DC/DC1 1l to a converter DC/DC1 1m) in the battery modules in the single battery cluster (for example, the battery cluster 1) (or when the second bus is an alternating current bus, second input/output ends of DC/AC converters in all the battery modules (for example, converters DC/AC1 in all the battery modules)) may be connected in series to each other and then coupled to the second bus, as shown in FIG. 4a or FIG. 4b. Optionally, the second input/output ends of the DC/DC converters in all the battery modules in the single battery cluster (for example, the battery cluster 1) may alternatively be coupled in parallel to the second bus, as shown in FIG. 4c or FIG. 4d. Optionally, as shown in FIG. 5, the energy storage system may alternatively construct a same second bus between different battery clusters, in other words, a plurality of battery clusters (for example, the battery cluster 1 to the battery cluster n) in the energy storage system share the same second bus. In this case, energy between the different battery modules in the single battery cluster can be balanced, and energy between different battery modules in different battery clusters can be balanced. The operation is flexible. As shown in FIG. 5, when all battery clusters in the energy storage system share the same second bus, second input/output ends of converters DC/DC1 in battery modules in each battery cluster may alternatively be coupled in parallel to the second bus. Optionally, the second input/output ends of the converters DC/DC1 included in the battery modules in each battery cluster in the energy storage system may be connected in series to each other and then coupled to the second bus. This may be specifically determined based on a requirement of an actual application scenario, and is not limited herein.

Figure 6A:
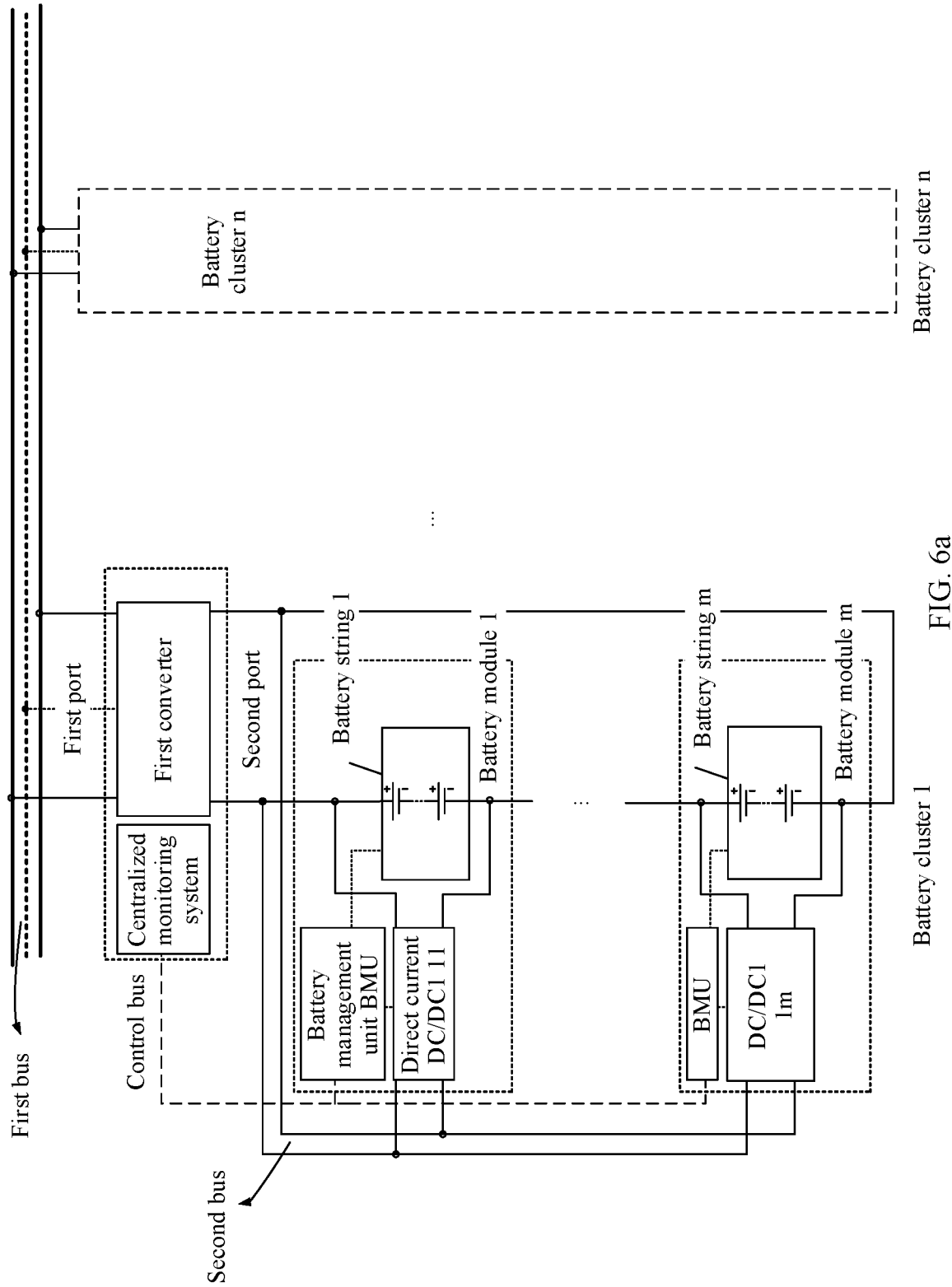
FIG. 6a is another schematic structural diagram of an energy storage system according to this application.

Energy Storage System Structure 6:

In some feasible implementations, when a second bus in the energy storage system is a direct current bus, the second bus may be directly coupled to an input/output end of a battery cluster. FIG. 6a is another schematic structural diagram of the energy storage system according to this application. A battery cluster 1 is used as an example. In the battery cluster 1, the second bus may be directly coupled to an input/output end of the battery cluster 1. Herein, the input/output end of the battery cluster 1 (when the battery cluster 1 is charged, the end is an input end of the battery cluster 1; and when the battery cluster 1 is discharged, the end is an output end of the battery cluster 1) is also an input/output port of a battery module 1 (when the battery module 1 is charged, the end is an input end of the battery module 1; and when the battery module 1 is discharged, the end is an output end of the battery module 1), and the input/output end of the battery module 1 is coupled to a second port of a converter 1. Therefore, the second bus of the battery cluster 1 may be directly coupled to the second port of the converter 1. When the second bus of the battery cluster 1 is directly connected to the second port of the battery cluster 1, a converter DC/DC1 in each battery module included in the battery cluster 1 may be a converter with a high boost ratio, to meet a conversion requirement from a voltage of a battery module in the battery cluster 1 to a voltage of the second port of the battery cluster 1. Optionally, in this application scenario, the converter DC/DC1 included in each battery module in the battery cluster 1 may use an isolated circuit topology, for example, a phase shifted dual active bridge circuit, a flyback circuit, an LLC resonant circuit, or the like, which may be specifically determined based on an actual application scenario. This is not limited herein.

Figure 6B:
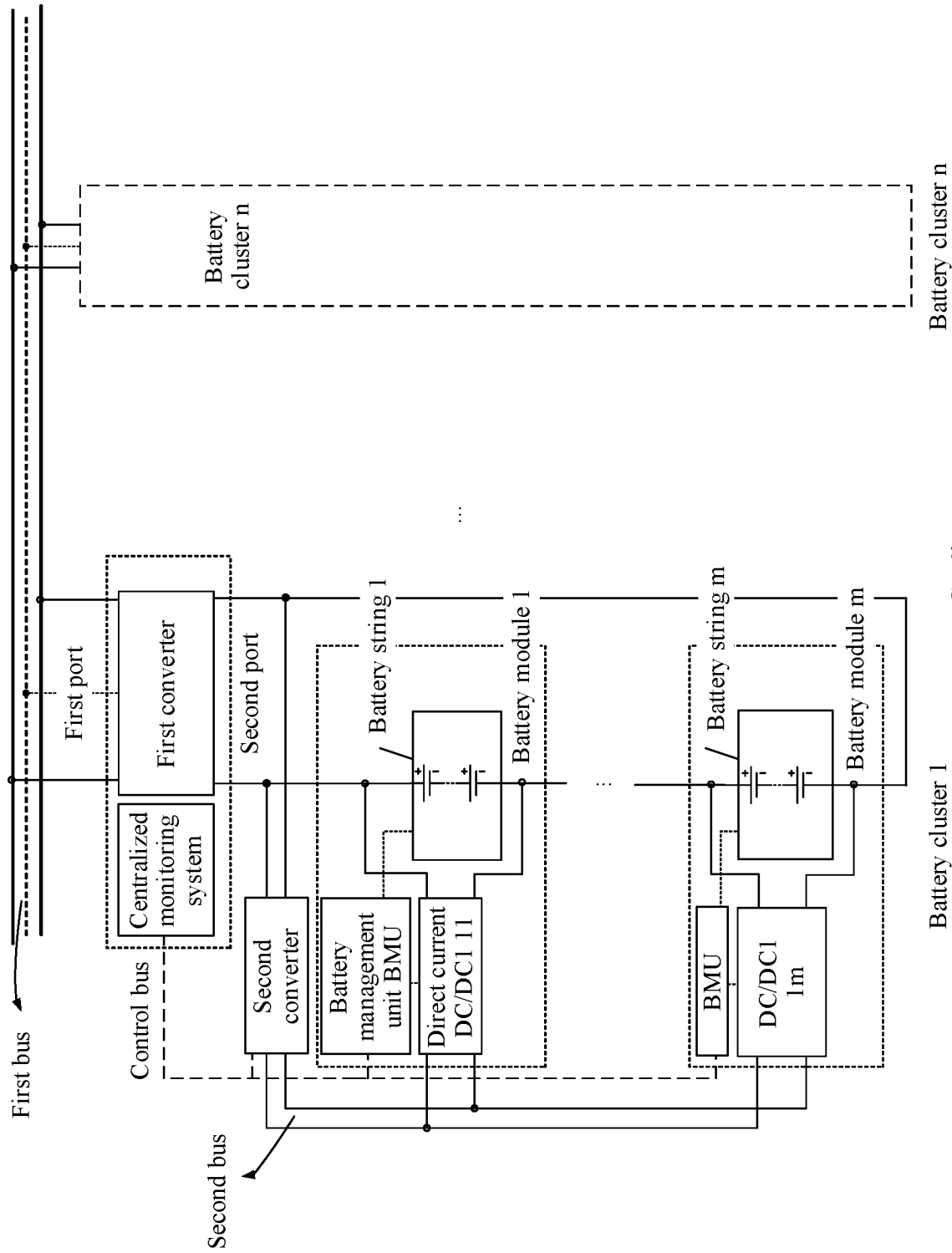
FIG. 6b is another schematic structural diagram of an energy storage system according to this application.

Energy Storage System Structure 7:

Optionally, in some feasible implementations, a second bus of each battery cluster may alternatively be coupled to a second port of a first bus connected to the battery cluster by using a second converter. For example, a second bus of a battery cluster 1 may alternatively be coupled to a second port of a converter 1 by using a second converter. FIG. 6b is another schematic structural diagram of the energy storage system according to this application. Herein, the second converter may be an auxiliary controlled DC/DC converter. Optionally, the second converter may alternatively be an auxiliary controlled DC/AC converter. When the second bus is a direct current bus, the second converter is the DC/DC converter. When the second bus is an alternating current bus, the second converter is a DC/AC converter. For ease of description, the following uses a converter 2 (for example, a converter DC/DC2) as an example for description. When the second bus is connected to the second port of the converter 1 by using the converter 2, the second bus may be controlled at a relatively constant voltage, for example, 48 V, 400 V, or 1000 V, or the second bus may be controlled within a specific voltage range, for example, 40 V to 100 V, 400 V to 500 V, or 900 V to 1200 V, which may be determined based on a requirement of an actual application scenario. This is not limited herein. In this case, the converter 2 may determine, based on selection of a voltage of the second bus, to use an isolated circuit topology or a non-isolated circuit topology. If the voltage of the second bus is 400 V (direct current), and a voltage of the second port of the converter 1 is 1000 V (direct current), a boost ratio of the voltage of the second port of the converter 1 to the voltage of the second bus is 2.5 (namely, 1000 V/400 V). The boost ratio is relatively small, and therefore the converter 2 can use the non-isolated circuit topology. If the voltage of the second bus is 48 V (direct current), and the voltage of the second port of the converter 1 is 1000 V (direct current), the boost ratio of the voltage of the second port of the converter 1 to the voltage of the second bus is greater than 20 (namely, 1000 V/48 V). The boost ratio is relatively high, and therefore the converter 2 usually uses the isolated circuit topology.

Figure 7A:
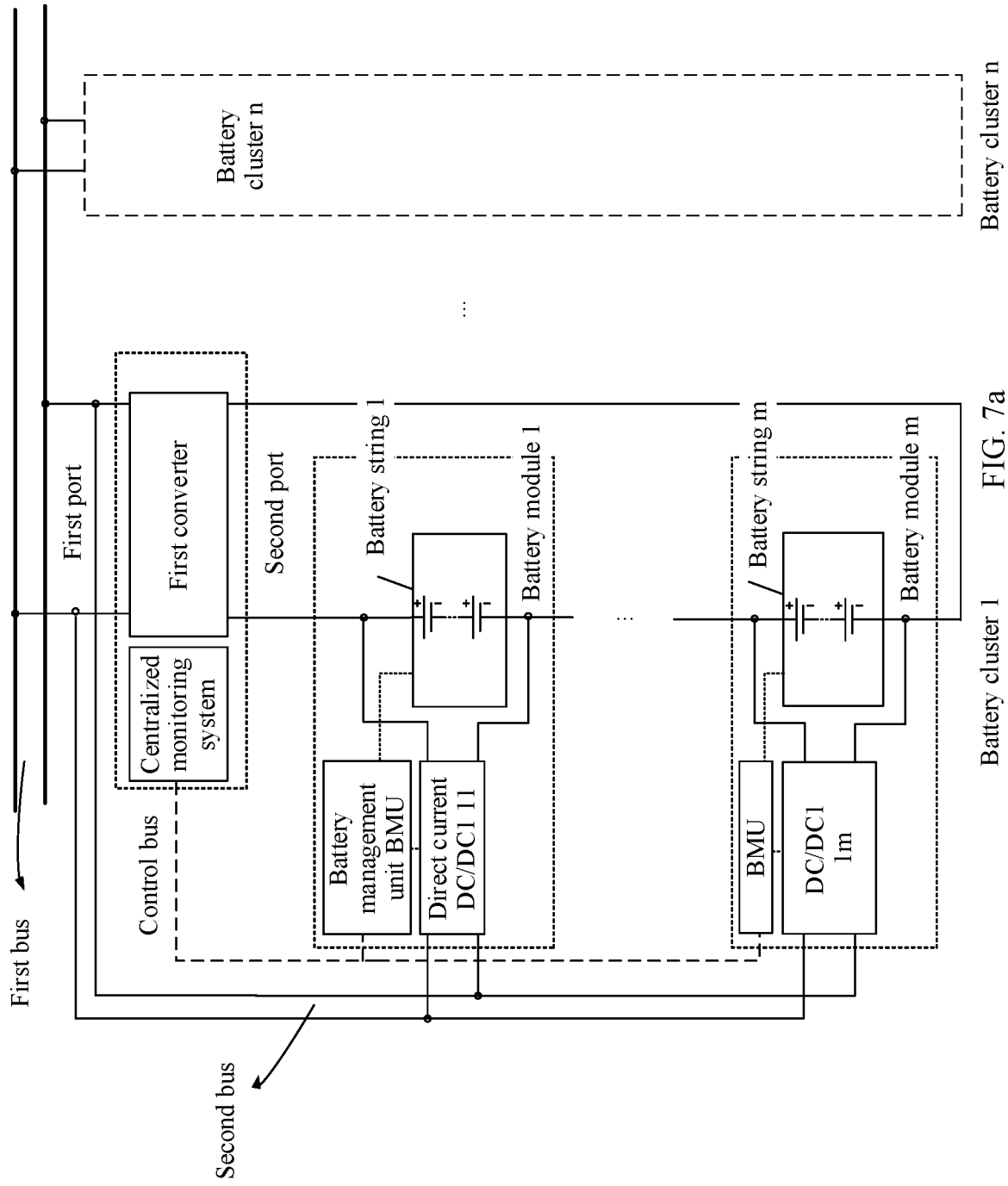
FIG. 7a is another schematic structural diagram of an energy storage system according to this application.

Energy Storage System Structure 8:

In some feasible implementations, when a first bus is a direct current bus and a second bus is also a direct current bus (or when the first bus is an alternating current bus and the second bus is also an alternating current bus), the second bus in the energy storage system may alternatively be directly connected to the first bus. FIG. 7a is another schematic structural diagram of the energy storage system according to this application. A battery cluster 1 is used as an example. When the first bus is the direct current bus and the second bus is also the direct current bus, the second bus of the battery cluster 1 may be directly coupled to a first port of a converter 1, and the first port of the converter 1 is coupled to the first bus. It may be understood that the second bus of the battery cluster 1 is directly coupled to the first bus in this case.

Figure 7B:
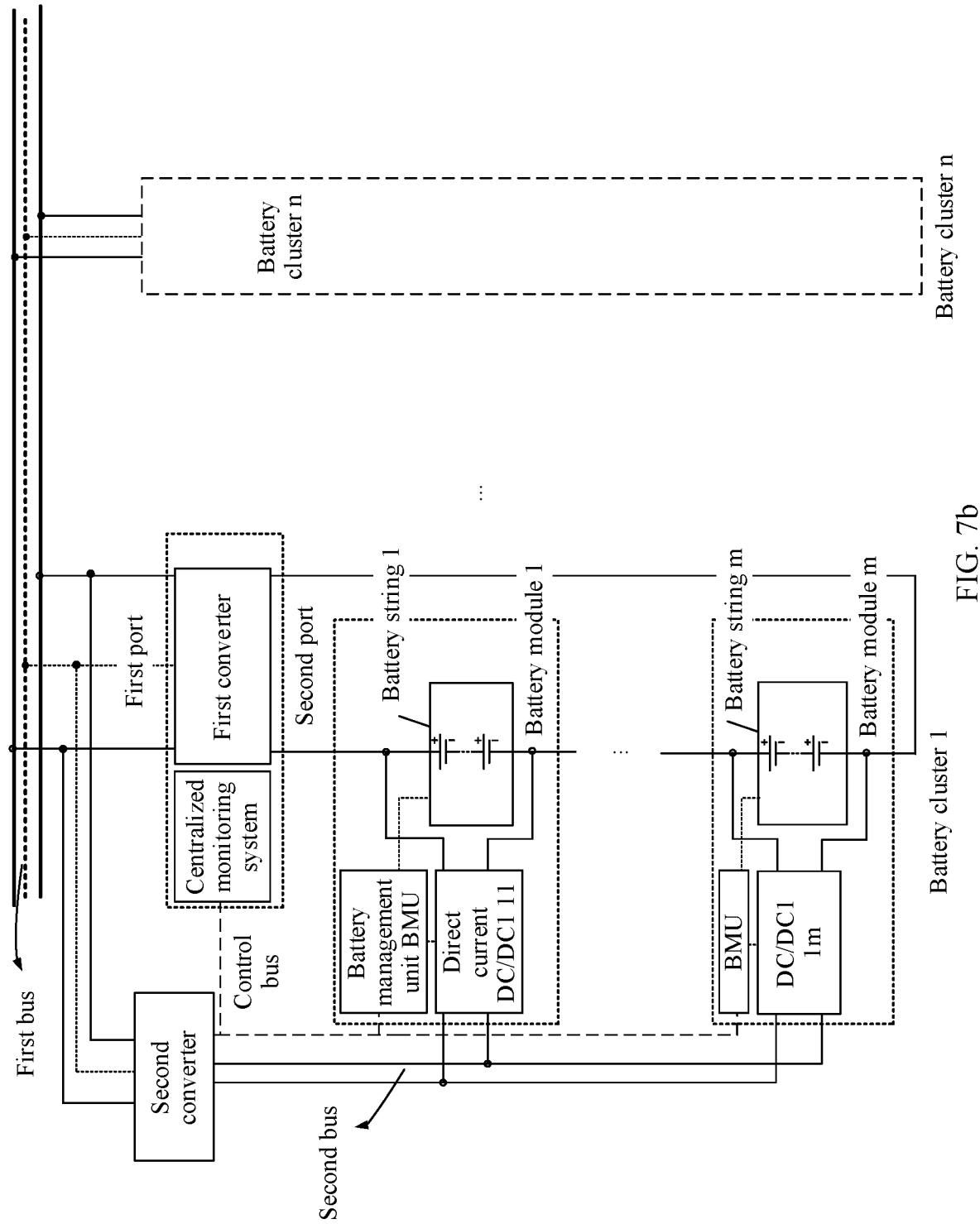
FIG. 7b is another schematic structural diagram of an energy storage system according to this application.

Energy Storage System Structure 9:

In some feasible implementations, a second bus of a battery cluster 1 may alternatively be coupled to a first port of a converter 1 by using a second converter. FIG. 7b is another schematic structural diagram of the energy storage system according to this application. If a first bus is a direct current bus, and the second bus is also a direct current bus, the second converter may be a DC/DC converter. If the first bus is a direct current bus, and the second bus is an alternating current bus, the second converter may be a DC/AC converter. If the first bus is an alternating current bus, and the second bus is a direct current bus, the second converter may also be a DC/AC converter. If the first bus is an alternating current bus, and the second bus is also an alternating current bus, the second converter may be an AC/AC converter. A type of the second converter may be determined based on types of the first bus and the second bus in an actual application scenario. This is not limited herein. Similarly, when the second bus of the battery cluster 1 is coupled to the first port of the converter 1 by using a converter 3, because the first port of the converter 1 is coupled to the first bus, it may be understood that the second bus of the battery cluster 1 is coupled to the first bus by using the second converter. Herein, both the energy storage system structure 9 and the energy storage system structure 7 are optional system structures, in other words, the energy storage system structure 7 and the energy storage system structure 9 are optional structures in parallel. Therefore, to distinguish descriptions of the second converter in the energy storage system structure 7 from descriptions of the second converter in the energy storage system structure 9, in the energy storage system structure 9, the second converter is described by using the converter 3 as an example. For ease of description, the following uses an example in which the second bus is the direct current bus for description. In this case, when the first bus is the direct current bus, the converter 3 is a DC/DC converter. When the first bus is the alternating current bus, the converter 3 is a DC/AC converter. As shown in FIG. 7a, when the second bus of the battery cluster 1 is directly coupled to the first bus, because a voltage of the first bus is usually relatively high and a voltage of the second bus is usually relatively low, to adapt to conversion from the voltage on the second bus side to the voltage on the first bus side, a converter with a high boost ratio may be selected for a DC/DC converter in each battery module in the battery cluster 1. For example, a converter DC/DC1 included in each battery module in the battery cluster 1 is selected as a converter using an isolated circuit topology. When the second bus in the battery cluster 1 is connected to the first bus by using the converter 3, the second bus may be controlled at a relatively constant voltage, for example, 48 V, 400 V, 1000 V, or the like, or the second bus may be controlled within a specific voltage range, for example, 40 V to 100 V, 400 V to 500 V, or 900 V to 1200 V, which may be specifically determined based on an actual application scenario. This is not limited herein.

Energy Storage Control Manners of the Energy Storage System:

The following describes, with reference to FIG. 8a to FIG. 8d, the energy storage control manners that may be used in the energy storage system provided in this application.

For ease of description, it is assumed that a first bus is a direct current bus of 1200 V, a second bus is a direct current bus of 400 V, and the second bus is coupled to a second port of a first converter (namely, a converter DC/DC) by using a second converter. An example in which a port voltage of each battery cluster (namely, a port voltage of the second port of the first converter) is 1000 V (direct current voltage), and a voltage of each battery module in a single battery cluster is 50 V (direct current voltage) is used for description. Because a port voltage of the single battery cluster is 1000 V (direct current), and the voltage of each battery module in the single battery cluster is 50 V (direct current), it can be learned that the single battery cluster includes 20 battery modules, in other words, m is equal to 20.

For ease of description, the following uses two battery clusters for description. A battery cluster 1 is used to describe a cooperative control manner between converters and buses when a battery is charged, and a battery cluster 2 is used to describe a cooperative control manner between the converters and the buses when the battery is discharged. For ease of description, in FIG. 8a to FIG. 8d, two extreme battery modules (for example, a battery module 1 and a battery module m) are used as an example for description in each battery cluster. A capacity of the battery module 1 is 50 V/250 Ah, and a capacity of the battery module m is 50 V/350 Ah. Herein, the capacity of the battery module 1 and the capacity of the battery module m are not equal, which may be caused by initial configuration, or may be caused by inconsistent battery attenuation speeds. This may be specifically determined based on an actual application scenario, and is not limited herein.

Figure 8A:
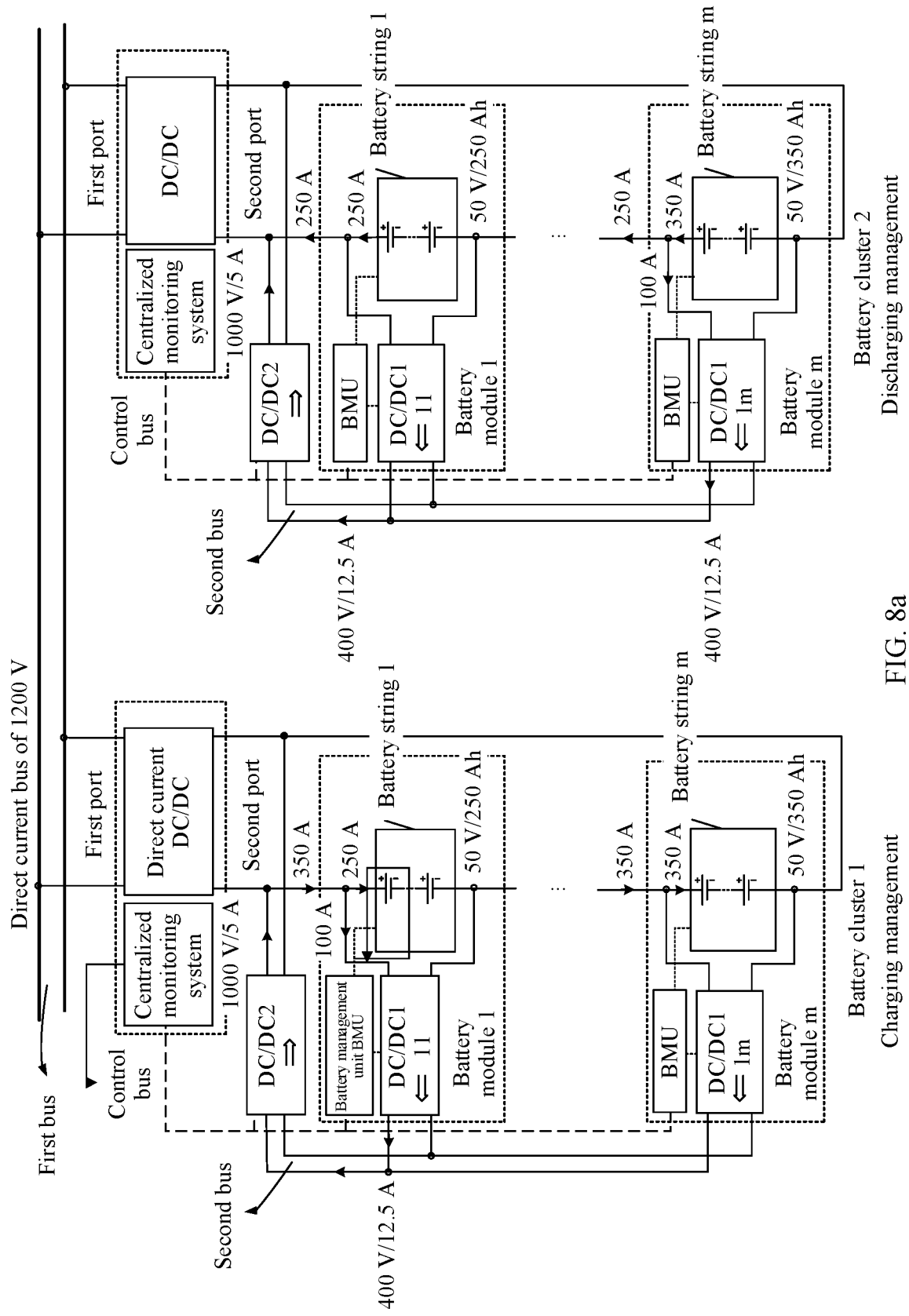
FIG. 8a is a schematic diagram of an energy storage control manner of an energy storage system according to this application.

FIG. 8a is a schematic diagram of an energy storage control manner of the energy storage system according to this application. In FIG. 8a, a converter DC/DC1 and a converter DC/DC2 each use a unidirectional converter. A battery cluster 1 in FIG. 8a is used as an example to describe a charge control manner of the energy storage system when capacities of battery modules in the battery cluster 1 are unequal. Because the converter DC/DC1 is the unidirectional converter, and a power direction of the converter is from a battery string side to a second bus, when a battery string is charged, to ensure that battery charging times of all battery strings in the entire battery cluster 1 are consistent (for example, the battery charging times of all the battery strings are the same, or a difference between the battery charging times of all the battery clusters falls within a preset error range), a maximum charging current of the battery cluster 1 is limited to a maximum current, to be specific, the maximum charging current of the battery cluster 1 is determined by a capacity of a battery module with a maximum capacity. For example, the battery module with the maximum capacity in the battery cluster 1 is a battery module m (in this case, the battery module m is a first energy storage module), and a capacity of the battery module m is 50 V/350 Ah. Therefore, to ensure that the battery charging times of all the battery strings in the entire battery cluster 1 are consistent, the maximum charging current of the battery cluster 1 may be determined to be 350 A. Because a maximum capacity of a battery module 1 is 250 Ah, a converter DC/DC1 1*l* in the battery module 1 needs to draw a current of 100 A from a battery side, and that a voltage of the battery module 1 is 50 V is considered, a power of the converter DC/DC1 is 5 kW (namely, 100 A×50 V). It is assumed that all other battery modules in the battery cluster 1 are battery modules with a capacity of 50 V/350 Ah, a voltage of the second bus is set to 400 V, and conversion efficiency of a converter DC/DC1 in each battery module is 1. In this case, a current of the second bus is 12.5 A (namely, 5 kW/400 V), and a second converter (the converter DC/DC2) needs to convert energy of 400 V/12.5 A into port energy of the battery cluster 1 (namely, port energy of a second port of a converter 1, 1000 V/5 A). In this way, energy balancing management of all the battery modules in the battery cluster 1 can be implemented.

A battery cluster 2 in FIG. 8*a* is used as an example to describe a discharge control manner of the energy storage system when capacities of battery modules in the battery cluster 2 are unequal. Similarly, because the converter DC/DC1 is a unidirectional converter, and the power direction of the converter DC/DC1 is from the battery side to the second bus, to ensure that battery discharging times of all battery strings in the entire battery cluster 2 are consistent, when the battery strings are discharged, a discharging current in the battery cluster 2 is limited to a minimum current, to be specific, the discharging current in the battery cluster 2 is determined by a capacity of a battery module with a minimum capacity (namely, a second energy storage module). For example, the battery module with the minimum capacity in the battery cluster 2 is the battery module 1 (in this case, the battery module 1 is the second energy storage module), and a capacity of the battery module 1 is 50 V/250 Ah. Therefore, to ensure that the battery discharging times of all the battery strings in the entire battery cluster 1 are consistent, the discharging current of the battery cluster 2 may be determined to be 250 A. Because a maximum capacity of a battery module m in the battery cluster 2 is 350 Ah, a converter DC/DC1 1*m* in the battery module m needs to draw a current of 100 A from the battery side, and that a port voltage of the battery module is 50 V is considered, a power of the converter DC/DC1 1*m* is 5 kW (namely, 100 A×50 V). It is assumed that all other battery modules in the battery cluster 2 are battery modules of 50 V/250 Ah, the voltage of the second bus is set to 400 V, and conversion efficiency of a converter DC/DC1 in each battery module is 1. In this case, the current of the second bus is 12.5 A (namely, 5 kW/400 V), and the converter DC/DC2 needs to convert energy of 400 V/12.5 A into port energy of the battery cluster 2 (namely, 1000 V/5 A). In this way, energy balancing management of all the battery modules in the battery cluster 1 is implemented.

Figure 8B:
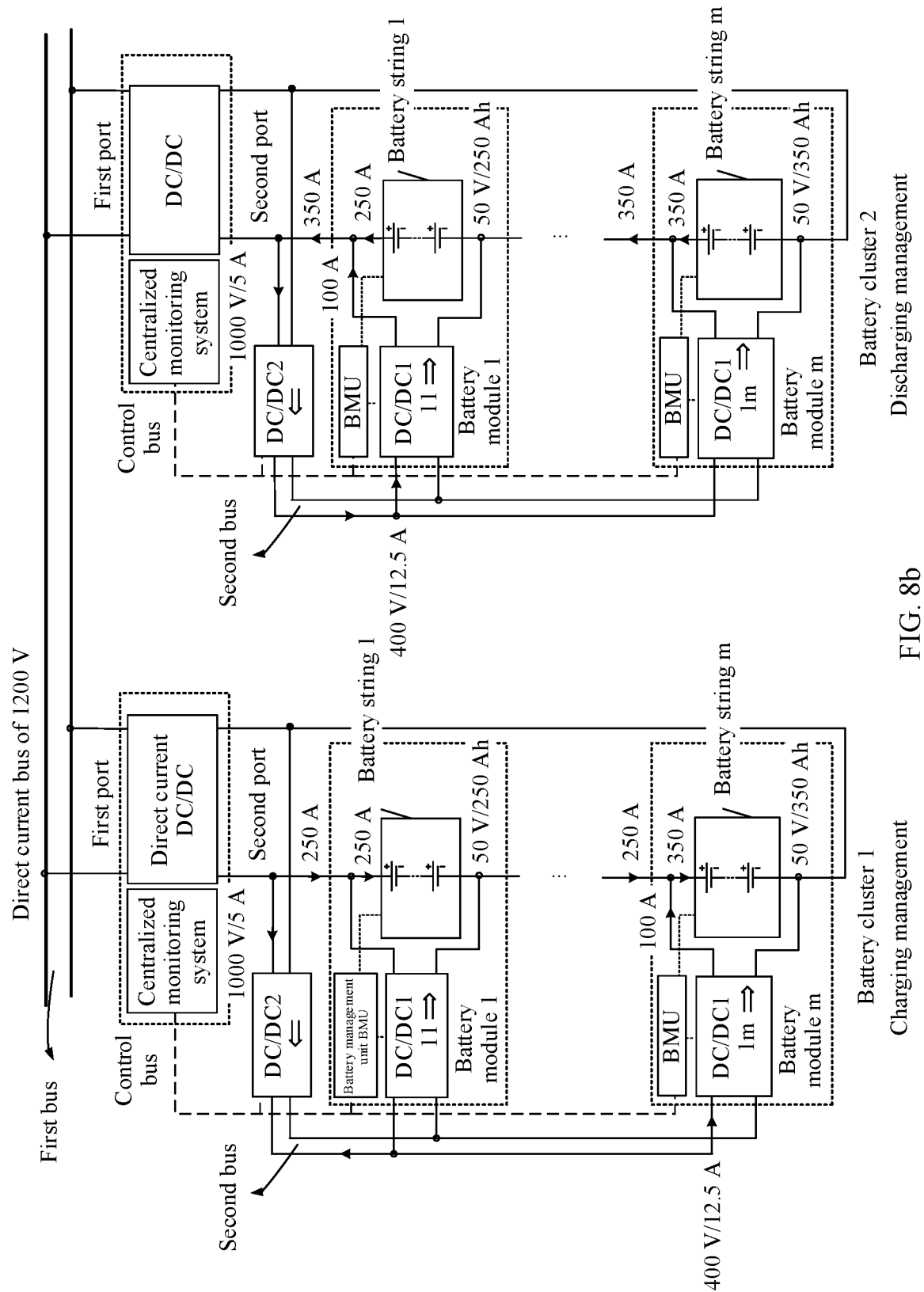
FIG. 8b is another schematic diagram of an energy storage control manner of an energy storage system according to this application.

Optionally, in some feasible implementations, a power direction of a converter DC/DC1 in each battery module in a battery cluster may be from the second bus to the battery module. Correspondingly, a power direction of a converter DC/DC2 needs to be from a port of the battery cluster (namely, a second port of a first converter) to the second bus, as shown in FIG. 8*b*. FIG. 8*b* is another schematic diagram of an energy storage control manner of the energy storage system according to this application. Because a power direction of a converter DC/DC1 in each battery module is adjusted, charge and discharge control manners also need to be adjusted accordingly. A charging process of a battery cluster 1 in FIG. 8*b* is used as an example. In this case, a maximum charging current of the battery cluster 1 is limited by a battery module with a minimum capacity in the battery cluster 1 (for example, a battery module 1, and in this case, the battery module 1 is a second energy storage module), to be specific, the maximum charging current of the battery cluster 1 is determined by a capacity of the battery module with the minimum capacity in the battery cluster 1 (namely, the second energy storage module). For example, the battery module with the minimum capacity in the battery cluster 1 is the battery module 1, and a capacity of the battery module 1 is 50 V/250 Ah. Therefore, in this case, the maximum charging current of the battery cluster 1 may be determined as 250 A. In this case, for a battery module whose capacity is 50 V/350 Ah (for example, a battery module m), a current difference of 100 A is compensated by using a converter DC/DC1 and a converter DC/DC2. When a battery is discharged, in this case, a maximum discharging current of the battery cluster 1 is limited by a battery module with a maximum capacity in the battery cluster 1 (for example, the battery module m, and in this case, the battery module m is a first energy storage module), to be specific, the maximum discharging current of the battery cluster 1 is determined by a capacity of the battery module with the maximum capacity in the battery cluster 1 (namely, the first energy storage module). For example, the battery module with the maximum capacity in the battery cluster 1 is the battery module m, and a capacity of the battery module m is 50 V/350 Ah. Therefore, in this case, the maximum charging current of the battery cluster 1 may be determined as 350 A. In this case, for a battery module of 250 Ah, a current difference of 100 A is compensated by using a converter DC/DC1 and a converter DC/DC2. In a specific implementation, in the energy storage system shown in FIG. 8*b*, battery charge and discharge control processes in the energy storage control manner of the energy storage system is just opposite to the battery charge and discharge control manners in FIG. 8*a*, and details are not described herein again.

Figure 8C:
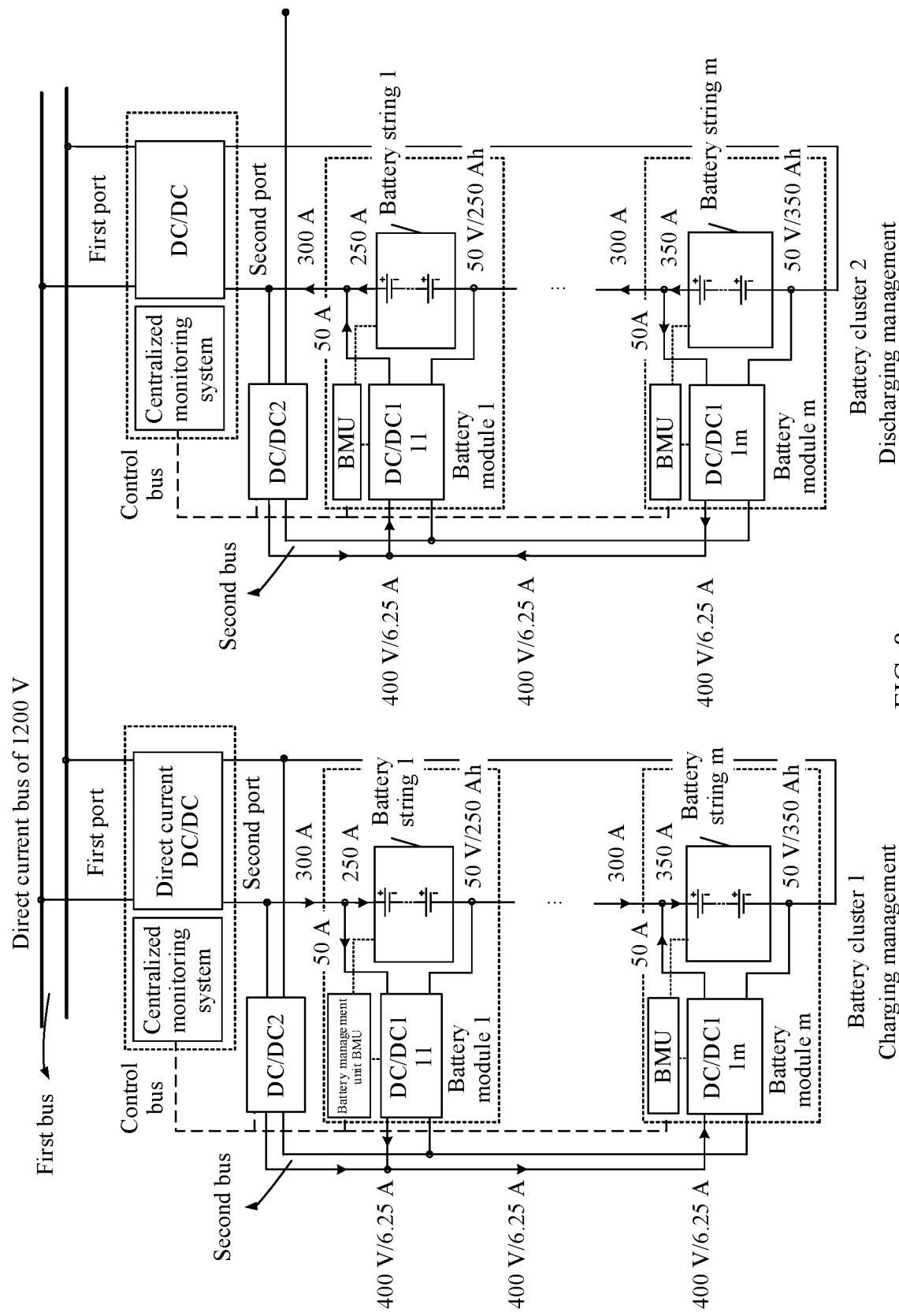
FIG. 8c is another schematic diagram of an energy storage control manner of an energy storage system according to this application.

FIG. 8*c* is another schematic diagram of an energy storage control manner of the energy storage system according to this application. In FIG. 8*c*, a converter DC/DC1 included in a battery module in each battery cluster and a converter DC/DC2 in the battery cluster each use a bidirectional converter. A battery cluster 1 in FIG. 8*c* shows a collaborative control manner of the energy storage system when a battery is charged. A battery cluster 2 in FIG. 8*c* shows a collaborative control manner of the energy storage system when the battery is discharged. When the energy storage system charges battery modules in the battery cluster 1, it is assumed that a charging current of the battery cluster 1 is 300 A. Similarly, to implement consistent charging and discharging times of all the battery modules in the battery cluster 1, for a battery module of 50 V/250 A (for example, a battery module 1), a converter DC/DC1 in the battery module needs to draw a current of 50 A from a battery side (a power of the converter DC/DC1 is 2.5 kW (namely, 50 V×50 A)), and for a battery module of 50 V/350 A (for example, a battery module m), a converter DC/DC1 in the battery module needs to pour a current of 50 A into the battery side. It is assumed that specifications of other battery modules in the battery cluster 1 are all 50 V/300 Ah, a second bus needs to transfer energy of 400 V/6.25 A (namely, 2.5 kW/400 V) of the battery module 1 to the battery module m. Converters DC/DC1 in the other battery modules does not need to handle differential energy. In addition, because energy in the battery module 1 in the battery cluster 1 and energy in the battery module m in the battery cluster 1 are just offset, a converter DC/DC2 in the battery cluster 1 does not need to process energy.

When battery modules in the battery cluster 2 are discharged, it is assumed that a discharging current of the battery cluster 2 is 300 A. Similarly, to implement consistent charging and discharging times of the battery modules in the battery cluster 2, for a battery module of 50 V/250 A (for example, a battery module 1), a converter DC/DC1 in the battery module needs to pour a current of 50 A into the battery side to compensate for a current difference of 300 A (a power of the converter DC/DC1 in the battery module is 2.5 kW (50 V×50 A)), and for a battery module of 50 V/350 A (for example, a battery module m), a converter DC/DC1 in the battery module needs to draw a current of 50 A from the battery side, so that the battery works in a maximum power output state. It is assumed that specifications of other battery modules in the battery cluster are all 50 V/300 Ah, the second bus needs to transfer energy of 400 V/6.25 A (namely, 2.5 kW/400 V) of the battery module m to the battery module 1. Converters DC/DC1 in the other battery modules does not need to handle differential energy. In addition, because energy in the battery module 1 in the battery cluster and energy in the battery module m in the battery cluster are just offset, a converter DC/DC2 in the battery cluster 2 does not need to process energy.

In actual application, to maximize utilization of the battery module and fully utilize a battery capability, when charging and discharging management is performed on the battery, in addition to ensuring that charging and discharging times of all battery modules are consistent, consistency of other energy storage element parameters of the battery modules may be ensured through system energy scheduling of a first bus and the second bus and collaborative control of converters. The energy storage element parameter may further include a charge/discharge (state of charge, SOC), an SOH, a port voltage (namely, a battery port voltage in charge/discharge), a depth of charge/discharge (depth of discharge, DOD), or the like. It may be understood that, that the energy storage element parameters of all the energy storage modules described herein are consistent may be that the energy storage element parameters of all the energy storage modules are the same (or equal), or a difference between the energy storage element parameters of all the energy storage modules is within a preset error range. For example, the difference is within a preset error range of 5%, which may be specifically determined based on an actual application scenario. This is not limited herein.

In the energy storage control manners shown in FIG. 8a to FIG. 8c, only one of the states is used to describe a collaborative control manner of the energy storage system provided in this application based on dual-bus energy management. In actual application, based on a battery status and a rated power output capability of each converter, there may be a plurality of collaborative control manners based on dual-bus energy management, and this is not limited herein. For example, for a newly assembled energy storage system with good battery consistency, charging and discharging management of each battery module included in each battery cluster in the energy storage system can be implemented by using only the first bus, and when a failure rate of the battery module in the battery cluster is relatively high, energy management of each battery module may be implemented independently by using the second bus, thereby ensuring continuous working of the energy storage system. The operations are flexible.

Figure 8D:
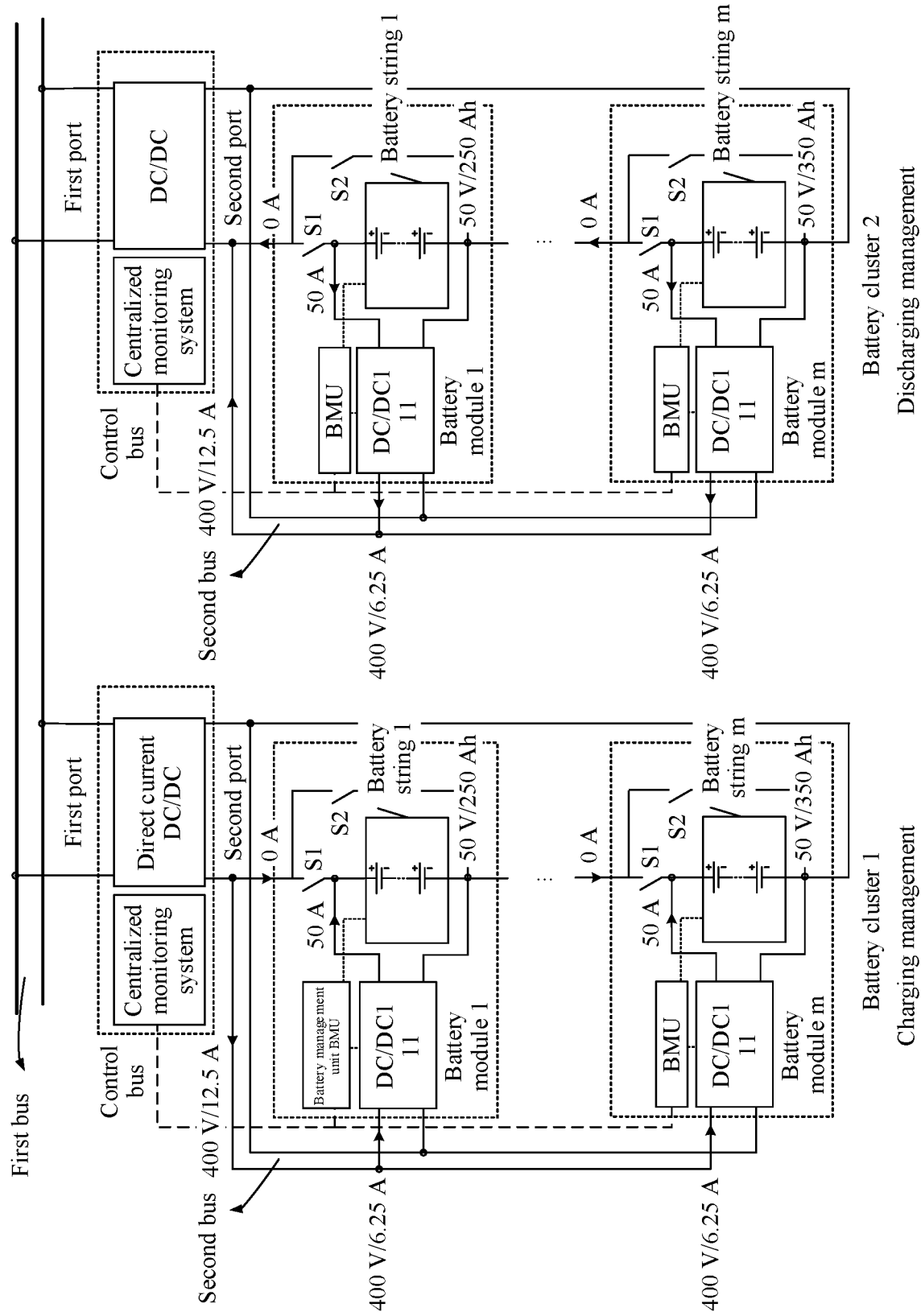
FIG. 8d is another schematic diagram of an energy storage control manner of an energy storage system according to this application.

FIG. 8d is another schematic diagram of an energy storage control manner of the energy storage system according to this application. Different from application scenarios shown in FIG. 8a to FIG. 8c, in an application scenario shown in FIG. 8d, a switch bridge arm is added to each battery module in a battery cluster, to implement flexible control of the battery module. In addition, to simplify system control, in the energy storage system shown in FIG. 8d, an example in which a second bus (it is assumed that the second bus is a direct current bus) is directly coupled to an input/output port of the battery cluster (namely, a second port of a first converter connected to the battery cluster) is used for description. It is assumed that 20 battery modules are still connected in series in each battery cluster, and after the energy storage system is used for a long time, only a remaining battery module 1 and a remaining battery module m in the battery cluster can work normally, and other battery modules are damaged or battery states of health SOH of the battery modules fall below a threshold (in other words, the SOHs of the battery modules cannot meet a requirement). In this case, all switch bridge arms in all the battery modules may be controlled to be in a disconnected state, and a current channel of each battery cluster is blocked, but each battery module may continue to be used depending on a capability of a DC/DC converter (namely, a converter DC/DC1) in the battery module. Limited by a rated power of the converter DC/DC1 in each battery module, for example, 2.5 kW, the battery module needs to be derated, but still has a specific power output capability. In addition, in a state such as frequency modulation and voltage regulation, when the energy storage system needs to absorb an instantaneous large power from a power grid or release an instantaneous large power, a first bus and the second bus may be simultaneously used to implement charging and discharging management on each battery module in the energy storage system, to increase a utilization rate of the battery module.

In this application, the energy storage system may implement the charging and discharging management on each battery module in the energy storage system based on the two buses, and an energy storage control manner of the charging and discharging management on each battery module may be adapted based on an electrical coupling manner of the first bus and the second bus, especially for adjustment of a second converter used for auxiliary control, which may be specifically determined based on an application scenario. This is not limited herein. The operations are flexible.

Figure 9A:
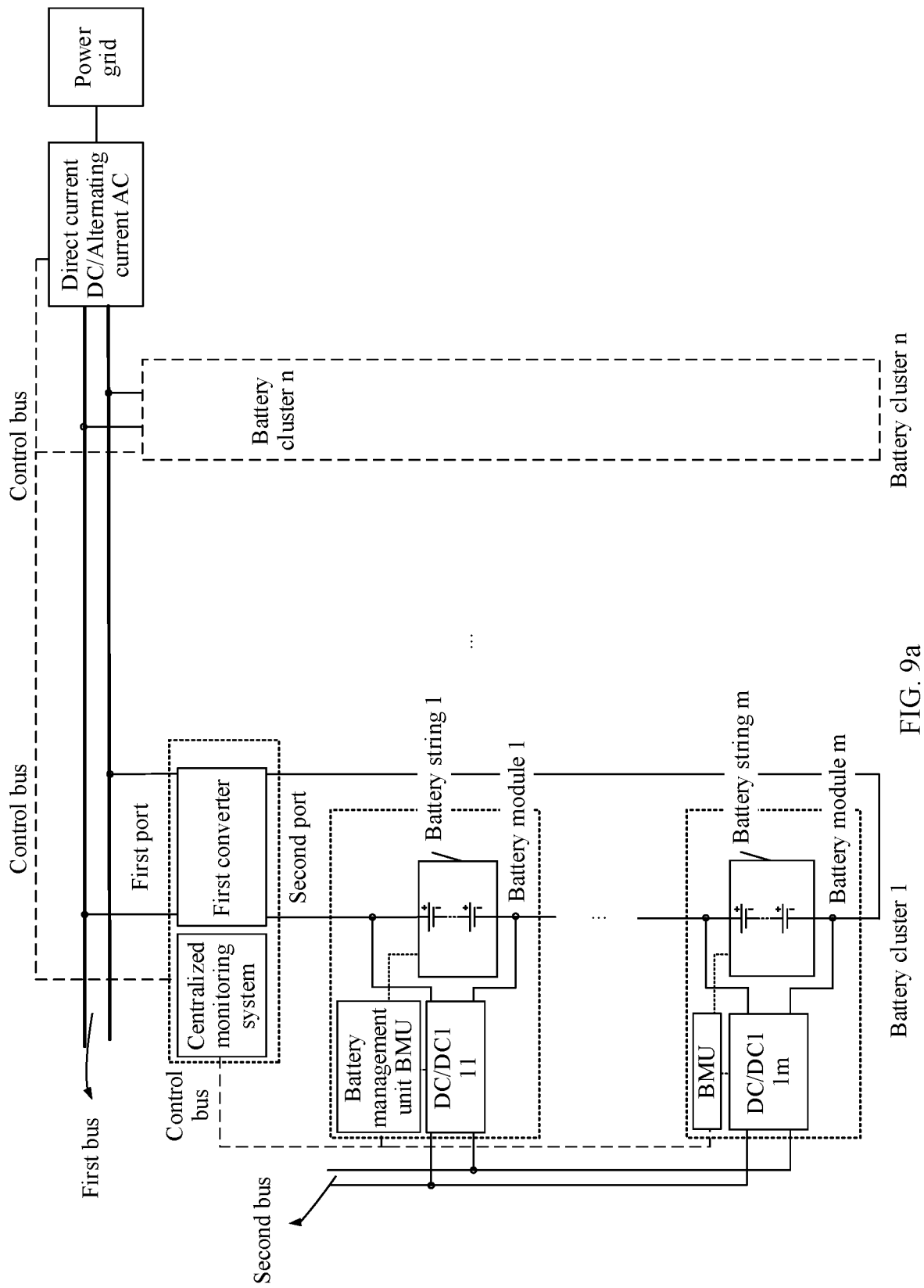
FIG. 9a is another schematic structural diagram of an energy storage system according to this application.
Figure 9B:
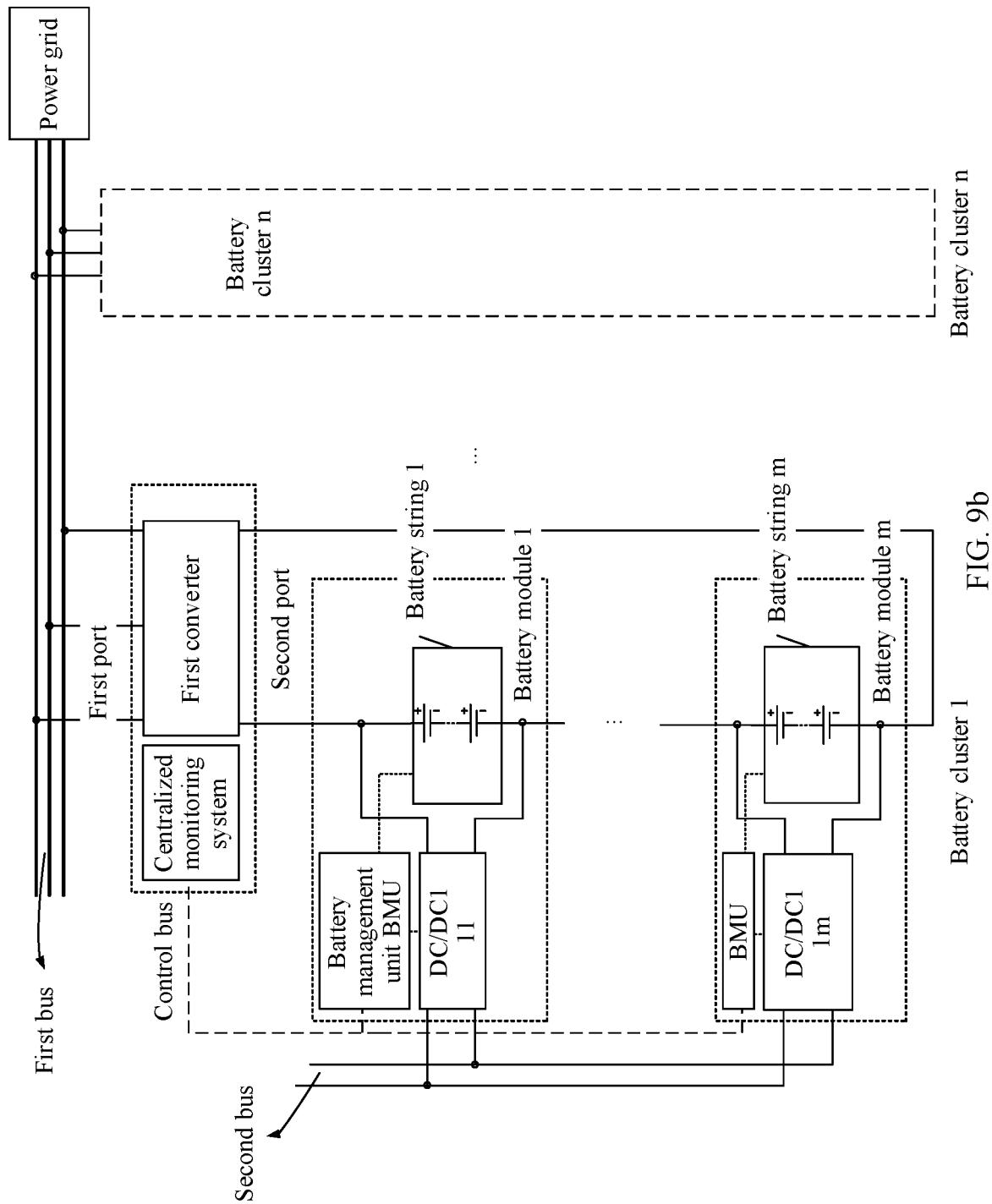
FIG. 9b is another schematic structural diagram of an energy storage system according to this application.
Figure 9C:
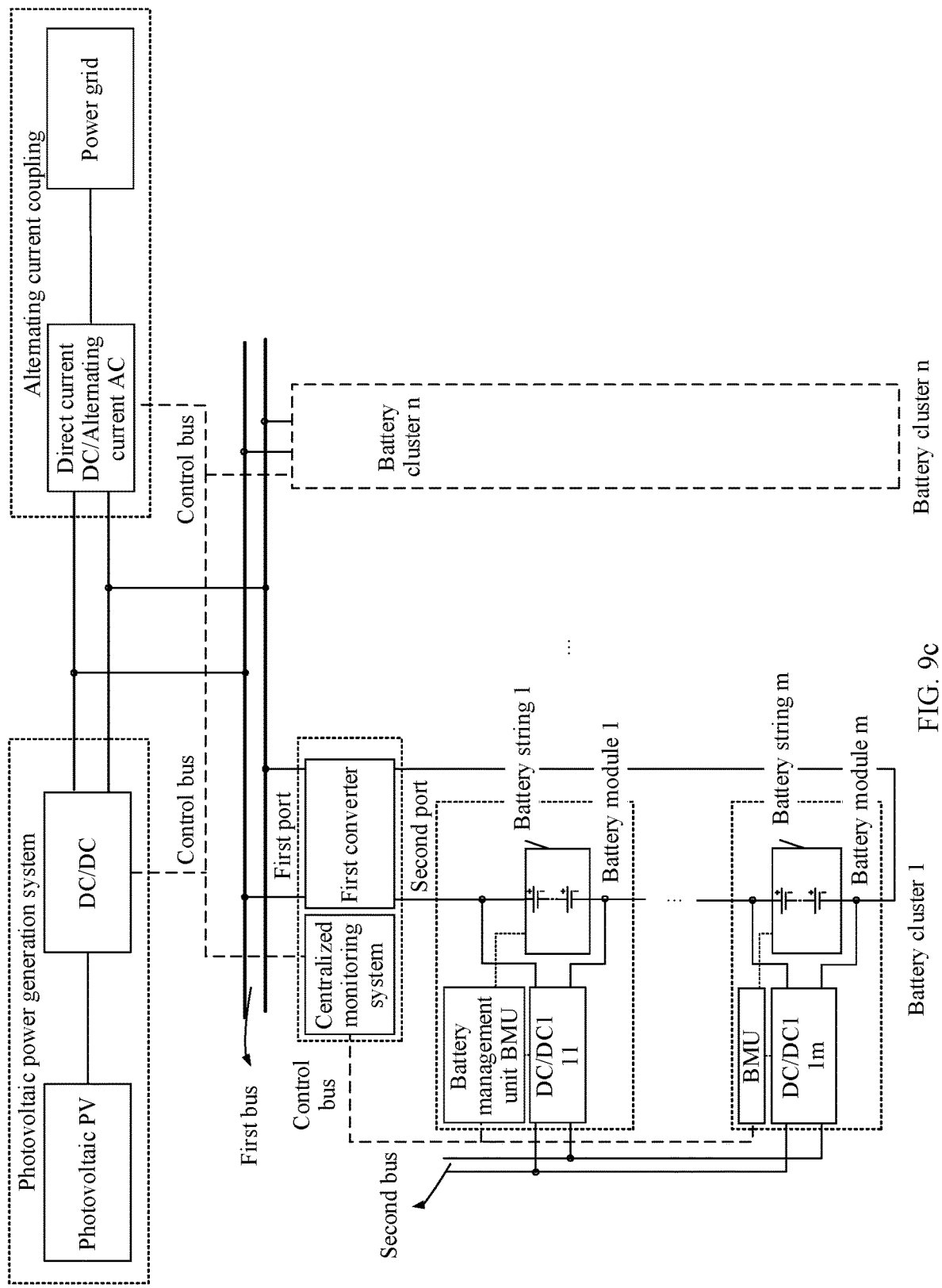
FIG. 9c is another schematic structural diagram of an energy storage system according to this application.

Application Scenarios of the Energy Storage System:

The energy storage system provided in this application (the energy storage system illustrated in any one of FIG. 4a to FIG. 7b) may be adapted to different application scenarios, for example, an application scenario of pure energy storage, an application scenario of hybrid optical storage, and an application scenario of hybrid wind storage, as shown in FIG. 9a to FIG. 9c. FIG. 9a is another schematic structural diagram of the energy storage system according to this application. As shown in FIG. 9a, if a first bus is a direct current bus, the first bus may be coupled to a power grid by using a DC/AC converter. A centralized monitoring system in a first converter (in this case, the first converter may be a DC/DC converter) connected to each battery cluster in the energy storage system may perform energy interaction with the DC/AC converter through a control bus, to implement energy interaction between a battery direct current and a power grid alternating current. It may be understood that an implementation in which the first bus is coupled to the power grid by using the DC/AC converter shown in FIG. 9a is applicable to any one of the energy storage system structures shown in FIG. 4a to FIG. 7b. This may be specifically determined based on an actual application scenario, and is not limited herein.

FIG. 9b is another schematic structural diagram of the energy storage system according to this application. If a first bus is an alternating current bus, the first bus may be directly connected to an alternating current power grid or an alternating current load. This may be specifically determined based on an actual application scenario, and is not limited herein. In this case, a first converter connected to each battery cluster in the energy storage system may be a DC/AC converter, so that energy interaction between each battery cluster in the energy storage system and the first bus can be implemented. Similarly, an implementation in which the first bus is directly connected to the alternating current power grid or the alternating current load shown in FIG. 9b is applicable to any one of the energy storage system structures shown in FIG. 4a to FIG. 7b. This may be specifically determined based on an actual application scenario, and is not limited herein.

FIG. 9c is another schematic structural diagram of the energy storage system according to this application. In some feasible implementations, when a first bus is a direct current bus, the first bus may be coupled to a photovoltaic (PV) power generation system by using a unidirectional DC/DC converter. A centralized monitoring system in a first converter connected to each battery cluster in the energy storage system may implement energy interaction through a control bus and by using the DC/DC converter that is connected to the photovoltaic power generation system and to which the first bus is coupled, to implement efficient utilization of photovoltaic energy. Herein, the DC/DC converter that is connected to the photovoltaic power generation system and to which the first bus is coupled may be a maximum power point tracking (MPPT) DC/DC converter. The photovoltaic power generation system may implement maximum power tracking by using the MPPT DC/DC converter, and implement electrical coupling and energy interaction with the energy storage system through the first bus. In addition, the first bus may be further coupled to an alternating current power grid by using the DC/AC converter, and the centralized monitoring system in the first converter connected to each battery cluster in the energy storage system may also implement energy interaction with the DC/AC converter through the control bus. In this way, energy interaction between the energy storage system and the power grid can be implemented.

The energy storage system and the corresponding energy storage control manners provided in this application can ensure high efficiency energy cycle of the energy storage system, and can also ensure a high utilization rate of each battery module in the energy storage system. An operation is flexible.

The foregoing descriptions are merely exemplary implementations of this application, but are not intended to limit the protection scope of this application. Any variation or replacement readily figured out by a person skilled in the art within the technical scope disclosed in this application may fall within the protection scope of this application.

What is claimed is:

1. An energy storage system, comprising:
    at least one energy storage unit cluster, wherein the at least one energy storage unit cluster comprises at least two energy storage modules, wherein the at least two energy storage modules are connected in series, and wherein one of the at least two energy storage modules comprises one energy storage element group and one direct current/direct current (DC/DC) converter;
    a first bus, wherein the at least one energy storage unit cluster is coupled to the first bus via a first converter;
    a second bus, wherein the second bus is a direct current bus, and wherein the energy storage element group is coupled to the second bus via the DC/DC converter; and
    a centralized monitoring system of the at least one energy storage unit cluster, wherein the centralized monitoring system is connected to the at least one energy storage unit cluster through a control bus, and is configured to control a respective DC/DC converter in any energy storage module in the at least one energy storage unit cluster to output a compensation current to an energy storage element group end or draw a current from an energy storage element group end, so that energy storage element parameters of all energy storage modules in the at least one energy storage unit cluster are consistent,
    wherein the one of the at least two energy storage modules further comprises one battery management unit (BMU),
    wherein the centralized monitoring system is connected to a respective BMU of each energy storage module in the at least one energy storage unit cluster through a control bus, and a controller in a respective BMU of a respective energy storage module controls the DC/DC converter to generate the compensation current to the energy storage element group end or draw the current from the energy storage element group end, so that the energy storage element parameters of all the energy storage modules in the at least one energy storage unit cluster are consistent,
    wherein a first input/output end of a respective DC/DC converter in any one of the at least two energy storage modules is coupled to an energy storage element group; and
    wherein second input/output ends of DC/DC converters in all of the at least two energy storage modules are connected in series to each other, and then are coupled to the second bus.

2. The energy storage system according to claim 1, wherein a first input/output end of a respective DC/DC converter in any one of the at least two energy storage modules is coupled to an energy storage element group; and
    wherein second input/output ends of DC/DC converters in all of the at least two energy storage modules are connected in parallel to the second bus.

3. The energy storage system according to claim 1, wherein the centralized monitoring system is integrated into the first converter.

4. The energy storage system according to claim 1, wherein a respective energy storage module further comprises a switch bridge arm, wherein the switch bridge arm comprises a master control switch and a bypass switch;
    wherein one end of the master control switch is connected to the energy storage element group in a respective energy storage module, and the other end of the master control switch is used as an input/output end of the respective energy storage module; and
    wherein one end of the bypass switch is connected to a first input/output end of the energy storage element group in a respective energy storage module, and the other end of the bypass switch is connected to a second input/output end of the respective energy storage module.

5. The energy storage system according to claim 1, wherein the first converter comprises a first port and a second port, wherein the first port is coupled to the first bus, and the second port is coupled to an input/output end of the at least one energy storage unit cluster; and
wherein the second bus is coupled to the first port.

6. The energy storage system according to claim 1, wherein the first converter comprises a first port and a second port, wherein the first port is coupled to the first bus, and the second port is coupled to an input/output end of the at least one energy storage unit cluster; and
wherein the second bus is coupled to the first port via a second converter.

7. The energy storage system according to claim 6, wherein the first bus is a direct current bus, and the second converter is a DC/DC converter, and wherein a boost ratio of the second converter is determined based on a voltage of the first bus and a voltage of the second bus; or
wherein the first bus is an alternating current bus, and the second converter is a DC/AC converter.

8. The energy storage system according to claim 1, wherein the first converter comprises a first port and a second port, wherein the first port is coupled to the first bus, and the second port is coupled to an input/output end of the at least one energy storage unit cluster; and
wherein the second bus is coupled to the second port.

9. The energy storage system according to claim 1, wherein the first converter comprises a first port and a second port, wherein the first port is coupled to the first bus, and the second port is coupled to an input/output end of the at least one energy storage unit cluster; and
wherein the second bus is coupled to the second port via a second converter.

10. The energy storage system according to claim 9, wherein the first bus is a direct current bus, wherein the first converter is a bidirectional DC/DC converter, wherein a circuit topology of the bidirectional DC/DC converter is a non-isolated circuit topology, and wherein a boost ratio of the bidirectional DC/DC converter is determined based on a voltage of the first bus and a port voltage of the energy storage unit cluster.

11. The energy storage system according to claim 9, wherein the first bus is an alternating current bus, wherein the first converter is a bidirectional DC/AC converter, wherein a circuit topology of the bidirectional DC/AC converter is a non-isolated circuit topology, and wherein a boost ratio of the bidirectional DC/AC converter is determined based on a port voltage of the energy storage unit cluster and a voltage of the first bus.

12. The energy storage system according to claim 9, wherein: the first bus is a direct current bus, and the second converter is a DC/DC converter; or the first bus is an alternating current bus, the first converter is a bidirectional DC/AC converter, and the second converter is a DC/DC converter; and
wherein a boost ratio of the second converter is determined based on a port voltage of the at least one energy storage unit cluster and a voltage of the second bus.

13. The energy storage system according to claim 1, wherein the energy storage element parameters comprise a charging/discharging time, a state of charge (SOC), a depth of discharge (DOD), a state of health (SOH), or a port voltage.

14. The energy storage system according to claim 1, wherein the DC/DC converter in a respective energy storage module is a unidirectional DC/DC converter;
wherein an energy direction of the unidirectional DC/DC converter is from the energy storage element group in a respective energy storage module to the second bus;
wherein a maximum charging current of the at least one energy storage unit cluster is determined based on a capacity of a first energy storage module in the at least one energy storage unit cluster, wherein the first energy storage module is an energy storage module with a maximum capacity out of the energy storage modules comprised in the at least one energy storage unit cluster; and
wherein a maximum discharging current of the at least one energy storage unit cluster is determined based on a capacity of a second energy storage module in the at least one energy storage unit cluster, wherein the second energy storage module is an energy storage module with a minimum capacity out of the energy storage modules comprised in the at least one energy storage unit cluster.

15. The energy storage system according to claim 1, wherein the DC/DC converter in a respective energy storage module is a unidirectional DC/DC converter;
wherein an energy direction of the unidirectional DC/DC converter is from the second bus to the energy storage element group in a respective energy storage module;
wherein a maximum discharging current of the at least one energy storage unit cluster is determined based on a capacity of a first energy storage module in the at least one energy storage unit cluster, wherein the first energy storage module is an energy storage module with a maximum capacity out of the energy storage modules comprised in the at least one energy storage unit cluster; and
wherein a maximum charging current of the at least one energy storage unit cluster is determined based on a capacity of a second energy storage module in the at least one energy storage unit cluster, wherein the second energy storage module is an energy storage module with a minimum capacity out of the energy storage modules comprised in the at least one energy storage unit cluster.

16. The energy storage system according to claim 1, wherein the energy storage system comprises a plurality of energy storage unit clusters, and the plurality of energy storage unit clusters share the second bus.

17. The energy storage system according to claim 1, wherein the voltage of the second bus is between 40 V and 100 V, or between 400 V and 500 V, or between 900 V and 1200 V.

18. The energy storage system according to claim 1, wherein the first bus is coupled to a photovoltaic power generation system via a unidirectional DC/DC converter.

19. The energy storage system according to claim 1, wherein the first bus is coupled to an alternating current load or an alternating current power grid via a bidirectional DC/AC converter.

20. An energy storage system, comprising:
at least one energy storage unit cluster, wherein the at least one energy storage unit cluster comprises at least two energy storage modules, wherein the at least two energy storage modules are connected in series, and wherein one of the at least two energy storage modules comprises one battery management unit (BMU), one energy storage element group and one direct current (DC)/alternating current (AC) converter;

a first bus, wherein the at least one energy storage unit cluster is coupled to the first bus via a first converter;

a second bus, wherein the second bus is an alternating current bus, and wherein the energy storage element group is coupled to the second bus via the DC/AC converter; and a centralized monitoring system of the at least one energy storage unit cluster, wherein the centralized monitoring system is connected to a BMU of each energy storage module in the at least one energy storage unit cluster through a control bus, and a controller in a respective BMU of a respective energy storage module controls a respective DC/AC converter to generate a compensation current to an energy storage element group end or draw a current from an energy storage element group end, so that energy storage element parameters of all the energy storage modules in the at least one energy storage unit cluster are consistent, wherein a first input/output end of a respective DC/AC converter in any one of the at least two energy storage modules is coupled to an energy storage element group; and wherein second input/output ends of DC/AC converters in all of the at least two energy storage modules are connected in series to each other, and then are coupled to the second bus.

21. The energy storage system according to claim 20, wherein the centralized monitoring system is integrated into the first converter.

22. The energy storage system according to claim 20, wherein a respective energy storage module further comprises a switch bridge arm, wherein the switch bridge arm comprises a master control switch and a bypass switch;

wherein one end of the master control switch is connected to the energy storage element group in a respective energy storage module, and the other end of the master control switch is used as an input/output end of the respective energy storage module; and wherein one end of the bypass switch is connected to a first input/output end of the energy storage element group in a respective energy storage module, and the other end of the bypass switch is connected to a second input/output end of the respective energy storage module.

23. The energy storage system according to claim 20, wherein the first converter comprises a first port and a second port, wherein the first port is coupled to the first bus, and the second port is coupled to an input/output end of the at least one energy storage unit cluster; and wherein the second bus is coupled to the first port.

24. The energy storage system according to claim 20, wherein the first converter comprises a first port and a second port, wherein the first port is coupled to the first bus, and the second port is coupled to an input/output end of the at least one energy storage unit cluster; and wherein the second bus is coupled to the first port via a second converter.

25. The energy storage system according to claim 20, wherein the first converter comprises a first port and a second port, wherein the first port is coupled to the first bus, and the second port is coupled to an input/output end of the at least one energy storage unit cluster; and wherein the second bus is coupled to the second port via a second converter.

26. The energy storage system according to claim 20, wherein the energy storage element parameters comprise a charging/discharging time, a state of charge (SOC), a depth of discharge (DOD), a state of health (SOH), or a port voltage.

* * * * *